(12) United States Patent
Chastney et al.

(10) Patent No.: US 10,284,813 B2
(45) Date of Patent: May 7, 2019

(54) AUTOMATIC CAMERA SELECTION

(71) Applicant: Microsoft Technology Licensing, LLC, Redmond, WA (US)

(72) Inventors: Daniel James Chastney, Sunnyvale, CA (US); Onur Cinar, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 190 days.

(21) Appl. No.: 14/504,367

(22) Filed: Oct. 1, 2014

(65) Prior Publication Data

US 2015/0264302 A1    Sep. 17, 2015

Related U.S. Application Data

(63) Continuation-in-part of application No. 14/216,223, filed on Mar. 17, 2014.

(51) Int. Cl.
| | |
|---|---|
| *G06F 3/00* | (2006.01) |
| *H04N 7/14* | (2006.01) |
| *H04N 21/4788* | (2011.01) |
| *H04N 21/414* | (2011.01) |
| *H04N 5/247* | (2006.01) |
| *H04M 1/725* | (2006.01) |
| *H04W 4/12* | (2009.01) |
| *G06F 3/01* | (2006.01) |
| *H04N 21/4223* | (2011.01) |

(52) U.S. Cl.
CPC ........ *H04N 7/142* (2013.01); *H04M 1/72555* (2013.01); *H04N 5/247* (2013.01); *H04N 7/147* (2013.01); *H04N 21/41407* (2013.01); *H04N 21/4788* (2013.01); *H04W 4/12* (2013.01); *H04M 2250/52* (2013.01); *H04N 21/4223* (2013.01); *H04N 2007/145* (2013.01)

(58) Field of Classification Search
CPC ........ H04N 7/142; H04N 5/247; H04N 7/147; H04M 1/72555
See application file for complete search history.

(56) References Cited

U.S. PATENT DOCUMENTS

| | | |
|---|---|---|
| 5,699,089 A | 12/1997 | Murray |
| 5,898,434 A | 4/1999 | Small et al. |

(Continued)

FOREIGN PATENT DOCUMENTS

| | | |
|---|---|---|
| CN | 101136875 A | 3/2008 |
| CN | 103037083 | 4/2013 |

(Continued)

OTHER PUBLICATIONS

"International Search Report and Written Opinion", Application No. PCT/US2015/020055, dated Jun. 9, 2015, 10 Pages.

(Continued)

*Primary Examiner* — Nicholas Augustine
(74) *Attorney, Agent, or Firm* — Schwegman Lundberg & Woessner, P.A.

(57) ABSTRACT

Various embodiments enable a video messaging experience which permits the exchange of short video messages in an asynchronous manner. The video messaging experience preserves the video intimacy and experience of synchronous-type video communications, while at the same time provides the convenience of SMS-type message exchange.

16 Claims, 15 Drawing Sheets

(56) References Cited

U.S. PATENT DOCUMENTS

| | | |
|---|---|---|
| 6,731,334 B1 | 5/2004 | Maeng et al. |
| 7,280,133 B2 | 10/2007 | Lord |
| 7,489,925 B2 | 2/2009 | Fry et al. |
| 7,769,142 B2 | 8/2010 | Selbie et al. |
| 7,984,098 B2 | 7/2011 | Enete et al. |
| 7,996,775 B2 | 8/2011 | Cole et al. |
| 8,209,385 B2 | 6/2012 | Partaker |
| 8,446,465 B2 | 5/2013 | Ambor et al. |
| 8,448,073 B2 | 5/2013 | Nimon et al. |
| 8,451,312 B2 | 5/2013 | Lee et al. |
| 8,451,994 B2 | 5/2013 | Abuan et al. |
| 8,489,696 B2 | 7/2013 | Cross et al. |
| 8,520,080 B2 | 8/2013 | Havens et al. |
| 8,549,435 B1 | 10/2013 | Bushore et al. |
| 8,571,330 B2 | 10/2013 | Gao et al. |
| 8,572,196 B2 | 10/2013 | Anderson et al. |
| 8,619,115 B2 | 12/2013 | Stephens et al. |
| 8,635,293 B2 | 1/2014 | Fisher et al. |
| 8,769,571 B2 | 7/2014 | de Léon et al. |
| 8,824,645 B2 | 9/2014 | Roberts et al. |
| 8,838,140 B1 | 9/2014 | Ledet |
| 9,047,509 B2 | 6/2015 | Wolk et al. |
| 9,071,725 B2 | 6/2015 | Enete et al. |
| 9,294,717 B2 | 3/2016 | Wohlert |
| 9,325,889 B2 | 4/2016 | Desai et al. |
| 9,344,673 B1 | 5/2016 | Buchheit et al. |
| 9,483,529 B1 | 11/2016 | Pasoi et al. |
| 9,485,542 B2 | 11/2016 | Girish et al. |
| 9,749,585 B2 | 8/2017 | Chastney et al. |
| 2002/0112005 A1 | 8/2002 | Namias |
| 2003/0023688 A1 | 1/2003 | Denenberg et al. |
| 2003/0208543 A1 | 11/2003 | Enete et al. |
| 2005/0166230 A1* | 7/2005 | Gaydou ............... G11B 27/034 |
| | | 725/41 |
| 2005/0270280 A1 | 12/2005 | Riback et al. |
| 2006/0218187 A1 | 9/2006 | Plastina |
| 2006/0294195 A1 | 12/2006 | Hyatt |
| 2007/0002016 A1 | 1/2007 | Cho et al. |
| 2008/0043943 A1 | 2/2008 | Sipher et al. |
| 2008/0095338 A1 | 4/2008 | Cosky |
| 2008/0133697 A1* | 6/2008 | Stewart ............. H04M 1/72522 |
| | | 709/217 |
| 2008/0167070 A1 | 7/2008 | Ishii et al. |
| 2008/0222710 A1 | 9/2008 | Blagsvedt et al. |
| 2008/0271098 A1 | 10/2008 | Kalaboukis |
| 2008/0288870 A1 | 11/2008 | Zheng et al. |
| 2009/0007018 A1 | 1/2009 | Ikeda et al. |
| 2009/0092234 A1 | 4/2009 | St. Onge et al. |
| 2009/0158136 A1 | 6/2009 | Rossano et al. |
| 2009/0228919 A1 | 9/2009 | Zott et al. |
| 2009/0327972 A1 | 12/2009 | McCann et al. |
| 2010/0082751 A1* | 4/2010 | Meijer ................... G06F 15/16 |
| | | 709/206 |
| 2010/0114337 A1 | 5/2010 | Husoy et al. |
| 2010/0192106 A1 | 7/2010 | Watanabe et al. |
| 2010/0217834 A1 | 8/2010 | Woodcock et al. |
| 2011/0107374 A1 | 5/2011 | Roberts et al. |
| 2011/0164105 A1* | 7/2011 | Lee ....................... H04N 7/142 |
| | | 348/14.02 |
| 2011/0239253 A1 | 9/2011 | West et al. |
| 2011/0249073 A1 | 10/2011 | Cranfill et al. |
| 2011/0249079 A1 | 10/2011 | Santamaria et al. |
| 2011/0289139 A1 | 11/2011 | McIntosh et al. |
| 2012/0019610 A1 | 1/2012 | Hornyak et al. |
| 2012/0050455 A1 | 3/2012 | Santamaria et al. |
| 2012/0062688 A1 | 3/2012 | Shen et al. |
| 2012/0092435 A1* | 4/2012 | Wohlert ................. H04N 7/147 |
| | | 348/14.02 |
| 2012/0117250 A1 | 5/2012 | Santamaria et al. |
| 2012/0117488 A1 | 5/2012 | Amidon et al. |
| 2012/0120186 A1 | 5/2012 | Diaz et al. |
| 2012/0166546 A1* | 6/2012 | Venon ................... G06F 19/321 |
| | | 709/205 |
| 2012/0281129 A1 | 11/2012 | Wang et al. |
| 2012/0282884 A1 | 11/2012 | Sun |
| 2012/0284094 A1 | 11/2012 | de Leon et al. |
| 2012/0287224 A1 | 11/2012 | Paris |
| 2012/0317210 A1 | 12/2012 | Fisher et al. |
| 2012/0317218 A1 | 12/2012 | Anderson et al. |
| 2012/0317240 A1 | 12/2012 | Wang |
| 2013/0005315 A1 | 1/2013 | Lemke et al. |
| 2013/0010051 A1 | 1/2013 | Shlaimoun et al. |
| 2013/0024785 A1 | 1/2013 | Van Wie |
| 2013/0060875 A1* | 3/2013 | Burnett ............. H04N 21/4788 |
| | | 709/206 |
| 2013/0066989 A1 | 3/2013 | Enete et al. |
| 2013/0083906 A1* | 4/2013 | Roberts ................. H04N 7/147 |
| | | 379/88.13 |
| 2013/0111365 A1 | 5/2013 | Chen et al. |
| 2013/0111377 A1* | 5/2013 | Newman ................. G06F 3/048 |
| | | 715/764 |
| 2013/0128058 A1 | 5/2013 | Sagayaraj et al. |
| 2013/0141513 A1 | 6/2013 | Setton et al. |
| 2013/0167044 A1 | 6/2013 | Graves et al. |
| 2013/0222521 A1 | 8/2013 | Lee et al. |
| 2013/0275519 A1 | 10/2013 | Nichols |
| 2013/0283319 A1 | 10/2013 | Marshall et al. |
| 2013/0311575 A1 | 11/2013 | Woods et al. |
| 2013/0317210 A1 | 11/2013 | Oroskar et al. |
| 2013/0321340 A1* | 12/2013 | Seo ....................... G06F 1/1641 |
| | | 345/174 |
| 2013/0328997 A1 | 12/2013 | Desai |
| 2013/0329100 A1 | 12/2013 | Desai et al. |
| 2014/0018046 A1 | 1/2014 | Grenier |
| 2014/0029801 A1 | 1/2014 | Chua et al. |
| 2014/0032682 A1 | 1/2014 | Prado et al. |
| 2014/0053206 A1* | 2/2014 | Shoykher ................ G06F 3/017 |
| | | 725/50 |
| 2014/0055978 A1 | 2/2014 | Gantz et al. |
| 2014/0067977 A1 | 3/2014 | Rasmussen et al. |
| 2014/0075375 A1 | 3/2014 | Hwang et al. |
| 2014/0079371 A1 | 3/2014 | Tang et al. |
| 2014/0096167 A1* | 4/2014 | Lang ................. H04N 21/4788 |
| | | 725/91 |
| 2014/0122628 A1 | 5/2014 | Yao et al. |
| 2014/0204173 A1 | 7/2014 | Eidelson et al. |
| 2014/0223462 A1* | 8/2014 | Aimone ................ A61B 5/0476 |
| | | 725/10 |
| 2014/0229835 A1 | 8/2014 | Ravine |
| 2014/0232813 A1* | 8/2014 | Lai ......................... H04N 7/147 |
| | | 348/14.02 |
| 2014/0282264 A1 | 9/2014 | Han |
| 2014/0324984 A1 | 10/2014 | Chang et al. |
| 2015/0024778 A1 | 1/2015 | Granito et al. |
| 2015/0057035 A1* | 2/2015 | Somekh ................... H04W 4/12 |
| | | 455/466 |
| 2015/0145946 A1* | 5/2015 | Xin ......................... H04N 7/155 |
| | | 348/14.06 |
| 2015/0149282 A1 | 5/2015 | Wolfe et al. |
| 2015/0220249 A1 | 8/2015 | Snibbe et al. |
| 2015/0264303 A1 | 9/2015 | Chastney et al. |
| 2015/0264304 A1 | 9/2015 | Chastney et al. |
| 2015/0264305 A1 | 9/2015 | Chastney et al. |
| 2015/0264307 A1 | 9/2015 | Chastney et al. |
| 2015/0264308 A1 | 9/2015 | Chastney et al. |
| 2015/0264309 A1 | 9/2015 | Chastney et al. |
| 2015/0264312 A1 | 9/2015 | Chastney et al. |
| 2015/0350270 A1* | 12/2015 | Caras ....................... H04L 51/10 |
| | | 709/203 |
| 2018/0160075 A1 | 6/2018 | Chastney et al. |

FOREIGN PATENT DOCUMENTS

| | | |
|---|---|---|
| CN | 103237107 | 8/2013 |
| EP | 2369820 | 9/2011 |
| EP | 2701393 | 2/2014 |

(56) References Cited

FOREIGN PATENT DOCUMENTS

| EP | 2728897 | 5/2014 |
|---|---|---|
| WO | WO-2014094211 | 6/2014 |

OTHER PUBLICATIONS

"International Search Report and Written Opinion", Application No. PCT/US2015/020056, dated Jun. 11, 2015, 11 Pages.
"International Search Report and Written Opinion", Application No. PCT/US2015/020654, dated Jun. 22, 2015, 11 Pages.
"International Search Report and Written Opinion", Application No. PCT/US2015/020652, dated Jun. 19, 2015, 12 Pages.
"International Search Report and Written Opinion", Application No. PCT/US2015/020658, dated Jun. 19, 2015, 12 Pages.
"Non-Final Office Action", U.S. Appl. No. 14/215,998, dated Dec. 4, 2015, 14 pages.
"Non-Final Office Action", U.S. Appl. No. 14/216,541, dated Dec. 7, 2015, 15 pages.
"Non-Final Office Action", U.S. Appl. No. 14/504,354, dated Dec. 7, 2015, 18 pages.
"Second Written Opinion", Application No. PCT/US2015/020658, dated Feb. 17, 2016, 7 pages.
"International Preliminary Report on Patentability", Application No. PCT/US2016020652, dated Feb. 24, 2016, 7 pages.
"Chatwala Introduces Groundbreaking Video Messaging Application Capturing Authentic Reactions to Video Messages", Retrieved from <http://www.businesswire.com/news/home/20140218005422/en/Chatwala-Introduces-Groundbreaking-Video-Messaging-Application-Capturing#.VFhlDvQW31> on Nov. 11, 2014, Feb. 18, 2014, 3 pages.
"How do I send and receive video messages in Skype for Windows Phone 8?", Retrieved from <https://support.skype.com/en/faq/FA12334/how-do-i-send-and-receivevideo-messages-in-skype-for-windows-phone-8> on Nov. 11, 2014, 2014, 6 pages.
"Moxtra", Retrieved from <http://www.appannie.com/apps/ios/app/moxtra-power-messaging-to-make-things-happen/> on Nov. 11, 2014, Jan. 16, 2013, 7 pages.
"WhatsApp Messenger Blog", Retrieved from <http://whatsapp.wordpress.com/2009/12/>, Dec. 2009, 3 pages.
Inkpen, et al.,' "Video Kids: Augmenting Close Friendships with Asynchronous Video Conversations in VideoPal", In Proceedings of Conference on Human Factors in Computing Systems, May 5, 2012, 10 pages.
Morgan, "Skype Qik Wants to Replace Instant Messages with Video Conversations", Retrieved from <http://www.expertreviews.co.uk/mobile-phones/1401699/skype-qik-wants-to-replace-instant-messages-with-video-conversations> on Nov. 5, 2014, Oct. 14, 2014, 6 pages.
Ritchie, "iMessage in iOS 8: Explained", Retrieved from <http://www.imore.com/imessage-ios-8-explained> on Nov. 5, 2014, Aug. 6, 2014, 11 pages.
"Facebook Messenger App Updated With Instant Video Sending and More", Retrieved from <http://gadgets.ndtv.com/apps/news/facebook-messenger-app-updated-withinstant-video-sending-and-more-540767> on Nov. 11, 2014, Jun. 13, 2014, 4 pages.
Van et al., "Scope: Providing Awareness of Multiple Notifications at a Glance", In Proceedings of the Working Conference on Advanced Visual Interfaces, May 22, 2002, 11 pages.
"Final Office Action", U.S. Appl. No. 14/215,998, dated May 4, 2016, 12 pages.
"Final Office Action", U.S. Appl. No. 14/504,354, dated Jun. 8, 2016, 15 pages.
"International Preliminary Report on Patentability", Application No. PCT/US2015/020056, dated May 17, 2016, 7 pages.
"International Preliminary Report on Patentability", Application No. PCT/US2015/020654, dated Jun. 10, 2016, 8 pages.
"International Preliminary Report on Patentability", Application No. PCT/US2015/020658, dated Jun. 10, 2016, 8 pages.
"Non-Final Office Action", U.S. Appl. No. 14/216,223, dated Jun. 22, 2016, 10 pages.
"Non-Final Office Action", U.S. Appl. No. 14/216,359, dated May 10, 2016, 12 pages.
"Play and reply to a video message", Retrieved on: Mar. 19, 2014 Available at: http://cdn01.oovoo.com/cdnhelp/en/content/Play_reply_video_message.html, 2 pages.
"Apple working on automatic camera detection feature for FaceTime video calls", Published on: Aug. 29, 2013 Available at: http://www.iphonehacks.com/2013/08/facetime-video-calls-automatic-camera-detection-feature.html, Aug. 29, 2010, 3 pages.
Cheny, et al., "Contextual Policy Enforcement in Android Applications with Permission Event Graphs", In Proceedings of Network and Distributed System Security Symposium, Feb. 24, 2013, 19 pages.
Gookin, "Record a Video Message on the Droid Bionic", Mar. 19, 2014 Available at: http://www.dummies.com/how-to/content/record-a-video-message-on-the-droid- bionic.html, 1 page.
Hoogs, et al., "Video Content Annotation Using Visual Analysis and a Large Semantic Knowledgebase", n Proceedings of IEEE Computer Society Conference on Computer Vision and Pattern Recognition, Jun. 18, 2003, 8 pages.
Kotenko, "Attention, Android users: Hoot could be the social video chat app you're looking for", Available at: http://www.digitaltrends.com/social-media/hoot-hands/#!AwXCI, Nov. 9, 2013, 6 pages.
Siegchrist, "WhatsApp: Send Video Messages and Texts for Free!", Retrieved on: Mar. 19, 2014 Available at: http://desktopvideo.about.com/od/videosharingwebsites/p/Whatsapp-Send-Video-Messages-And-Texts-For-Free.html, 1 page.
Siegchrist, "SnapChat Video Messaging App for Android and iOS", Retrieved on: Mar. 19, 2014 Available at: http://desktopvideo.about.com/od/videohostingsites/p/Snapchat-Video-Messaging-App-For-Android-And-Ios.html, 1 pages.
"Final Office Action", U.S. Appl. No. 14/216,541, dated Apr. 13, 2016, 14 pages.
"Second Written Opinion", Application No. PCT/US2015/020056, dated Feb. 19, 2016, 7 pages.
"Second Written Opinion", Application No. PCT/US2015/020654, dated Feb. 22, 2016, 7 pages.
"International Preliminary Report on Patentability", Application No. PCT/US2015/020652, dated Feb. 24, 2016, 7 pages.
"Final Office Action", U.S. Appl. No. 14/216,223, dated Nov. 4, 2016, 11 pages.
"Final Office Action", U.S. Appl. No. 14/216,359, dated Dec. 6, 2016, 14 pages.
"Final Office Action", U.S. Appl. No. 14/216,541, dated Dec. 1, 2016, 16 pages.
"Non-Final Office Action", U.S. Appl. No. 14/215,998, dated Sep. 9, 2016, 16 pages.
"Non-Final Office Action", U.S. Appl. No. 14/216,541, dated Aug. 11, 2016, 14 pages.
"Non-Final Office Action", U.S. Appl. No. 14/504,292, dated Sep. 16, 2016, 9 pages.
"Non-Final Office Action", U.S. Appl. No. 14/504,324, dated Sep. 16, 2016, 11 pages.
"Non-Final Office Action", U.S. Appl. No. 14/504,354, dated Oct. 5, 2016, 16 pages.
"Final Office Action", U.S. Appl. No. 14/504,354, dated Feb. 28, 2017, 13 pages.
"Final Office Action", U.S. Appl. No. 14/504,324, dated May 19, 2017, 13 pages.
"Final Office Action", U.S. Appl. No. 14/215,998, dated Apr. 10, 2017, 16 pages.
"Non-Final Office Action", U.S. Appl. No. 14/216,223, dated Mar. 6, 2017, 8 pages.
"Notice of Allowance", U.S. Appl. No. 14/216,359, dated Apr. 27, 2017, 8 pages.
"Corrected Notice of Allowance", U.S. Appl. No. 14/216,359, dated Jul. 24, 2017, 2 pages.
"Final Office Action", U.S. Appl. No. 14/504,292, dated Jun. 1, 2017, 11 pages.
"Non-Final Office Action", U.S. Appl. No. 14/215,998, dated Aug. 7, 2017, 14 pages.
"Non-Final Office Action", U.S. Appl. No. 14/216,541, dated May 30, 2017, 17 pages.

(56) References Cited

OTHER PUBLICATIONS

"Non-Final Office Action", U.S. Appl. No. 14/504,354, dated Jun. 20, 2017, 14 pages.
"Notice of Allowance", U.S. Appl. No. 14/216,223, dated Aug. 18, 2017, 8 pages.
"Non-Final Office Action", U.S. Appl. No. 14/504,324, dated Sep. 11, 2017, 13 pages.
"Foreign Office Action", EP Application No. 15716607.5, dated Oct. 6, 2017, 7 pages.
"Final Office Action Issued in U.S. Appl. No. 14/504,324", dated Apr. 5, 2018, 13 Pages.
"Final Office Action Issued in U.S. Appl. No. 14/504,354", dated Jan. 26, 2018, 18 Pages.
"First Office Action & Search Report Issued in Chinese Patent Application No. 201580014560.5", dated Aug. 2, 2018, 12 Pages.

\* cited by examiner

AUTOMATIC CAMERA SELECTION

RELATED APPLICATION

This application is a continuation-in-part of, and claims priority to U.S. patent application Ser. No. 14/216,223, filed on Mar. 17, 2014, the disclosure of which is incorporated by reference herein.

BACKGROUND

Voice over Internet Protocol (VoIP) communications continue to evolve and can provide a desirable and efficient way for parties to communicate with one another. In particular, VoIP calls that include a video element in which calling parties see one another can provide an intimate and desirable experience.

Yet, these types of communications continue to have barriers that affect the extent to which many users engage them. For example, consider the case where a video communication is desired using, for example, VoIP. Typically, in order to have such a video communication, contact details are exchanged between parties such that each party's contact details reside in one another's contact list. Further, both parties in a video communication are typically required to be on the line at same time. This can present problems particularly across varying time zones. In addition, video communications using VoIP generally require high-end computing devices with fairly high bandwidth network connections. Even if all of these challenges are met, there still may be problems in connecting video calls and sustaining the calls for any period of time.

SUMMARY

This Summary is provided to introduce a selection of concepts in a simplified form that are further described below in the Detailed Description. This Summary is not intended to identify key features or essential features of the claimed subject matter.

Various embodiments enable a video messaging experience which permits the exchange of short video messages in an asynchronous manner. The video messaging experience preserves the video intimacy and experience of synchronous-type video communications, while at the same time provides the convenience of SMS-type message exchange.

A computer-implemented method enable a particular camera mode, either front camera mode or rear camera mode for example, to be automatically selected in accordance with a user's, action in the context of a video messaging experience.

A user input is received at a user interface of a computer device. If the user input is associated with sending a video message, a front facing camera of the computer device is automatically selected for recording a video to enable preparation of the video message. A front facing camera is a camera which is arranged to capture a view of a user of the computer device.

If the user input is not associated with sending a video message, a different camera is selected to record the video, for example, the rear camera.

The method can be implemented by a video messaging application which is executed on one or more processor of the computer device. In this context, "short" means a video of a maximum permitted length. A video message includes such a video, and an identifier of a recipient of the message, such as an addressee.

In at least some of the following described embodiments, automatic selection of a particular camera mode simplifies the user interaction with the computer device. For example, where the computer device is a mobile phone, typically a user holds and operates the device with the same hand. In this context, it is useful to minimise the number of interactions that a user has while a user is holding the device to make a recording. Thus, it is particularly advantageous to avoid the need for a user to have to select a particular camera using a normal selection mechanism available on the device, for example, by an icon on the touch screen. Instead, a camera is automatically selected to record the video based on the user's interaction with the computer device.

The disclosure also provides a computing device with multiple cameras including at least a front facing camera oriented to capture a view of a user of the computing device, and one or more processor connected to the cameras and to user input component. A computer readable storage media of the device has instructions embodied on it which perform operations in accordance with the above-defined method.

A computer readable media itself is also provided.

Various embodiments enables a short video message to be recorded and for a single action to be utilized to stop the recording and send the short video message to one or more intended recipients.

Various embodiments provide an ability to visually annotate, in a plurality of video message conversations, a respective status of each video message conversation in the plurality of video message conversations. In some cases, a video message conversation can be represented using a thumbnail video image. Some embodiments generate the thumbnail video image based, at least in part, on a most recently received video clip in the respective video message conversation.

Other embodiments enable portions of video message conversations to be played back in an interconnected fashion. Specifically, a filmstrip is provided as part of a user interface. The filmstrip includes a video representation, e.g. a thumbnail image, associated with each short video message in a video message conversation. Selection of a particular video representation were result in the video message conversation being played back, from that point, in a continuous fashion which includes the other short video messages that serially follow the selected video representation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
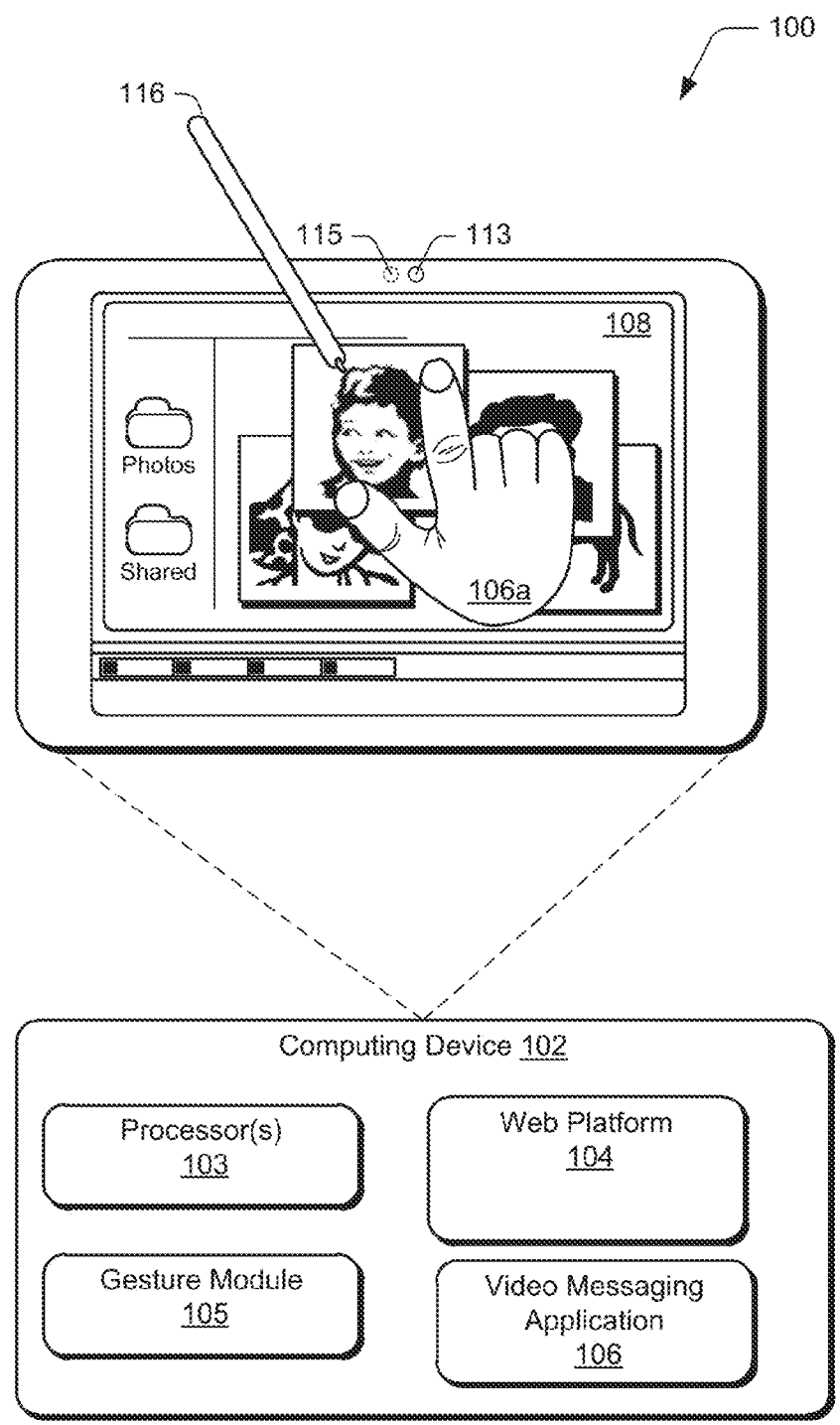
FIG. 1 is an illustration of an environment in an example implementation in accordance with one or more embodiments.

Various embodiments enable a video messaging experience which permits the exchange of short video messages in an asynchronous manner. The short video message can have any suitable length. For example, in some embodiments, the short video messages can have lengths up to about 40 second. In yet other embodiments, the short video messages can range from between 10-20 second in length. The video messaging experience preserves the video intimacy and experience of synchronous-type video communications, while at the same time provides the convenience of SMS-type message exchange. So, for example, whenever a particular individual has an opportunity, they can record and send a short video message to another person. The other person can reply, at their convenience, with a similar short video message. This approach solves the problem of requiring the parties to be online at the same time because the short video messages can be queued up by a corresponding video messaging application and presented to the recipient when the recipient launches or returns to the video messaging application. This approach also mitigates the need for high-end devices and high bandwidth connections because the short video messages are, as the name implies, short and can be easily exchanged on lower-end devices in suitable, less complicated file formats or streaming formats.

The video messaging experience is provided by a video messaging application which, in at least some embodiments, enables a short video message to be recorded and for a single action to be utilized to stop the recording and send the short video message to one or more intended recipients.

Various embodiments provide an ability to visually annotate, in a plurality of video message conversations, a respective status of each video message conversation in the plurality of video message conversations. A video message conversation can be thought of as a collection of short video messages associated with a common conversation thread. Thus, a video message conversation is essentially a series of back-and-forth short video messages between recipients. In some cases, a video message conversation can be represented using a thumbnail video image. Some embodiments generate the thumbnail video image based, at least in part, on a most recently received video clip in the respective video message conversation.

Yet other embodiments enable a particular camera mode, either front camera mode or rear camera mode, to be automatically selected in accordance with a user's action. For example, if a user opens up a new message and provides an address, an assumption is made that the user intends to send a short video message that includes a video of himself or herself. Accordingly, the front-facing camera is automatically selected so that a video of the user can be taken while a verbal message is conveyed. If, on the other hand, the user chooses to enter a record mode before choosing the intended recipient, an assumption is made that the user intends to capture video associated with their environment. Accordingly, the rear-facing camera, is automatically selected for video capture.

Other embodiments enable portions of video message conversations to be played back in an interconnected fashion. Specifically, a filmstrip is provided as part of a user interface. The filmstrip includes a video representation, e.g. a thumbnail image, associated with each short video message in a video message conversation. Selection of a particular video representation were result in the video message conversation being played back, from that point, in a continuous fashion which includes the other short video messages that serially follow the selected video representation.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

Example Operating Environment

FIG. 1 is an illustration of an environment 100 in an example implementation that is operable to employ the techniques described in this document. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 also includes a web platform 104. The web platform works in connection with content of the web, e.g. public content such as web pages and the like. A web platform can include and make use of many different types of technologies such as, by way of example and not limitation, URLs, HTTP, REST, HTML, CSS, JavaScript, DOM, and the like. The web platform can also work with a variety of data formats such as XML, JSON, and the like. Web platforms can include web browsers, local applications, and the like.

Computing device 102 also includes a gesture module 105 that recognizes input pointer gestures that can be performed by one or more fingers, and causes operations or actions to be performed that correspond to the gestures. The gestures may be recognized by module 105 in a variety of different ways. For example, the gesture module 105 may be configured to recognize a touch input, such as a finger of a user's hand 106a as proximal to display device 108 of the computing device 102 using touchscreen functionality, or functionality that senses proximity of a user's finger that may not necessarily be physically touching the display device 108, e.g., using near field technology. Module 105 can be utilized to recognize single-finger gestures and bezel gestures, multiple-finger/same-hand gestures and bezel gestures, and/or multiple-finger/different-hand gestures and bezel gestures.

Computing device 102 also includes a video messaging application 106 that can be invoked to execute on the computing device. Computing device 102 also includes one or more of a front-facing camera 113 and a rear-facing camera 115. These cameras can be used in conjunction with the video messaging application 106 as described above and below.

The voice messaging application 106 provides a number of different features including, by way of example and not limitation, single action stop and send recording, annotating video thumbnail representations, automatic camera selection, playback of interconnected short video messages, preemptive processing, and other features that are described in more detail below.

The computing device 102 may also be configured to detect and differentiate between a touch input (e.g., provided by one or more fingers of the user's hand 106a) and a stylus input (e.g., provided by a stylus 116). The differentiation may be performed in a variety of ways, such as by detecting an amount of the display device 108 that is contacted by the finger of the user's hand 106a versus an amount of the display device 108 that is contacted by the stylus 116.

Thus, the gesture module 105 may support a variety of different gesture techniques through recognition and leverage of a division between stylus and touch inputs, as well as different types of touch inputs and non-touch inputs.

Figure 2:
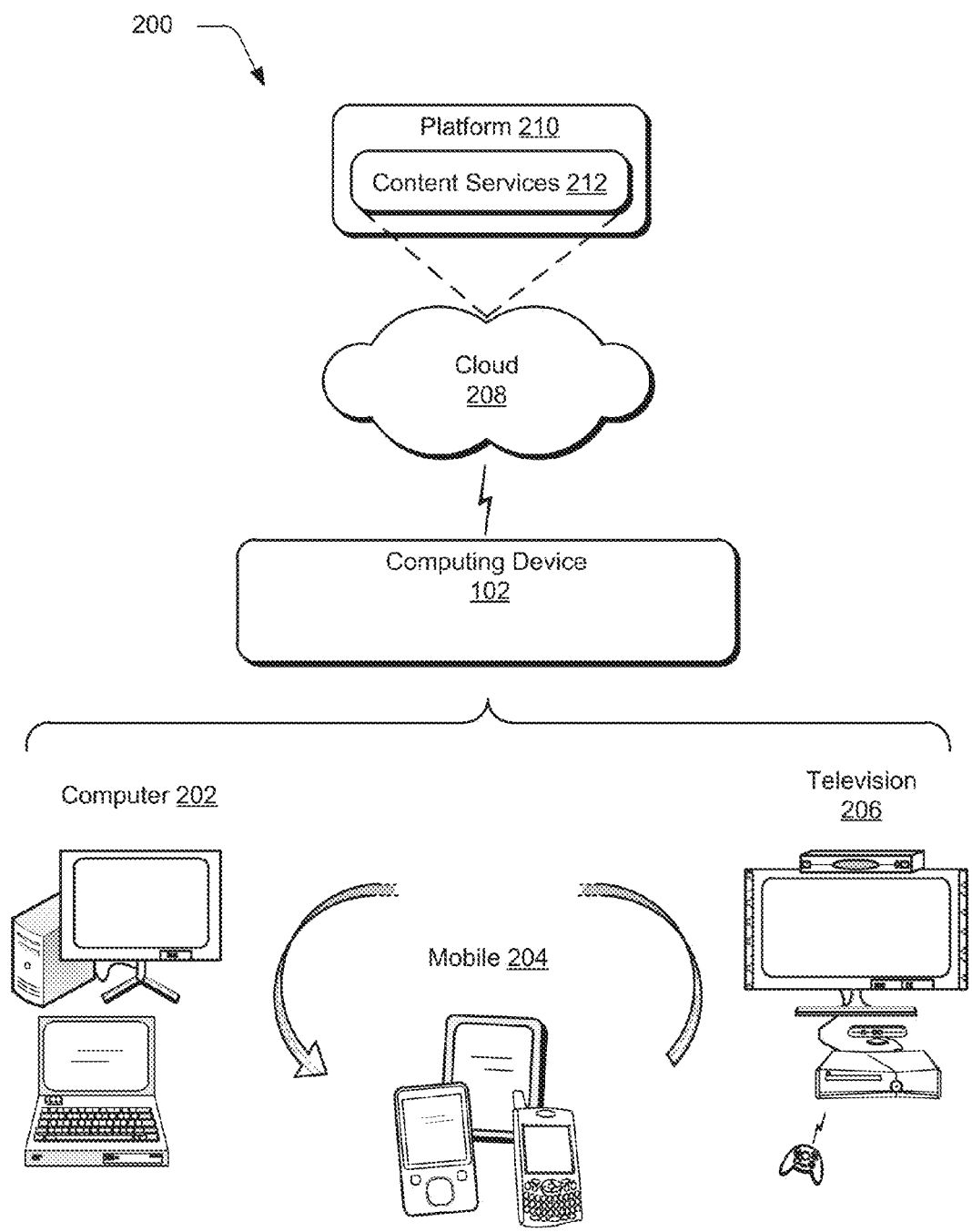
FIG. 2 is an illustration of a system in an example implementation showing FIG. 1 in greater detail.

FIG. 2 illustrates an example system 200 that includes the computing device 102 as described with reference to FIG. 1. The example system 200 enables ubiquitous environments for a seamless user experience when running applications on a personal computer (PC), a television device, and/or a mobile device. Services and applications run substantially similarly in all three environments for a common user experience when transitioning from one device to the next while utilizing an application, playing a video game, watching a video, and so on.

In the example system 200, multiple devices are interconnected through a central computing device. The central computing device may be local to the multiple devices or may be located remotely from the multiple devices. In one embodiment, the central computing device may be a cloud of one or more server computers. These computers can be connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 202, mobile 204, and television 206 uses. Each of these configurations includes devices that may have generally different constructs and capabilities, and thus the computing device 102 may be configured according to one or more of the different device classes. For instance, the computing device 102 may be implemented as the computer 202 class of a device that includes a personal computer, desktop computer, a multi-screen computer, laptop computer, netbook, and so on. Each of these different configurations may employ a web platform, e.g. a web browser, as described above and below.

The computing device 102 may also be implemented as the mobile 204 class of device that includes mobile devices, such as a mobile phone, portable music player, portable gaming device, a tablet computer, a multi-screen computer, and so on. The computing device 102 may also be implemented as the television 206 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 208 includes and/or is representative of a platform 210 for content services 212. The platform 210 abstracts underlying functionality of hardware (e.g., servers) and software resources of the cloud 208. The content services 212 may include applications and/or data that can be utilized while computer processing is executed on servers that are remote from the computing device 102. Content services 212 can be provided as a service over the Internet and/or through a subscriber network, such as a cellular or Wi-Fi network.

The platform 210 may abstract resources and functions to connect the computing device 102 with other computing devices. The platform 210 may also serve to abstract scaling of resources to provide a corresponding level of scale to encountered demand for the content services 212 that are implemented via the platform 210. Accordingly, in an interconnected device embodiment, implementation of functionality described herein may be distributed throughout the system 200. For example, the functionality may be implemented in part on the computing device 102 as well as via the platform 210 that abstracts the functionality of the cloud 208.

Such functionality can include a video messaging service and, in particular, a video messaging service some aspects of which can be implemented by video messaging application 106, and other aspects of which can be implemented by content services 212, as described above and below.

Figure 13:
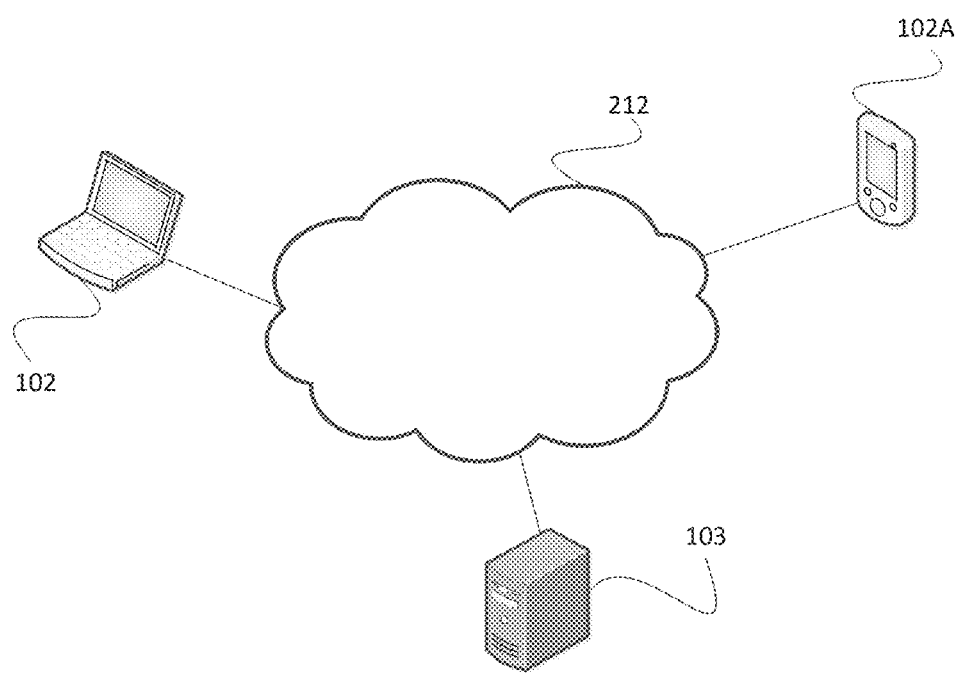
FIG. 13 is a schematic diagram of an overall communication system.

FIG. 13 illustrates another computer device 102A which is in communication with the computer device 102 by a network 211 or other communication medium. The video messaging services implemented by content services 212 can include, by way of example and not limitation, serving as a message exchange focal point between users of the devices 102, 102A who send and receive short video messages to and from each other, providing a mechanism by which preprocessing can be performed, for example, preemptive uploading and preemptive downloading of short video messages, as well as other backend services typically provided by servers that support the exchange of messages such as SMS messages. Although only two devices 102, 102A are shown, there could be many devices in communication with one another.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices.

Figure 12:
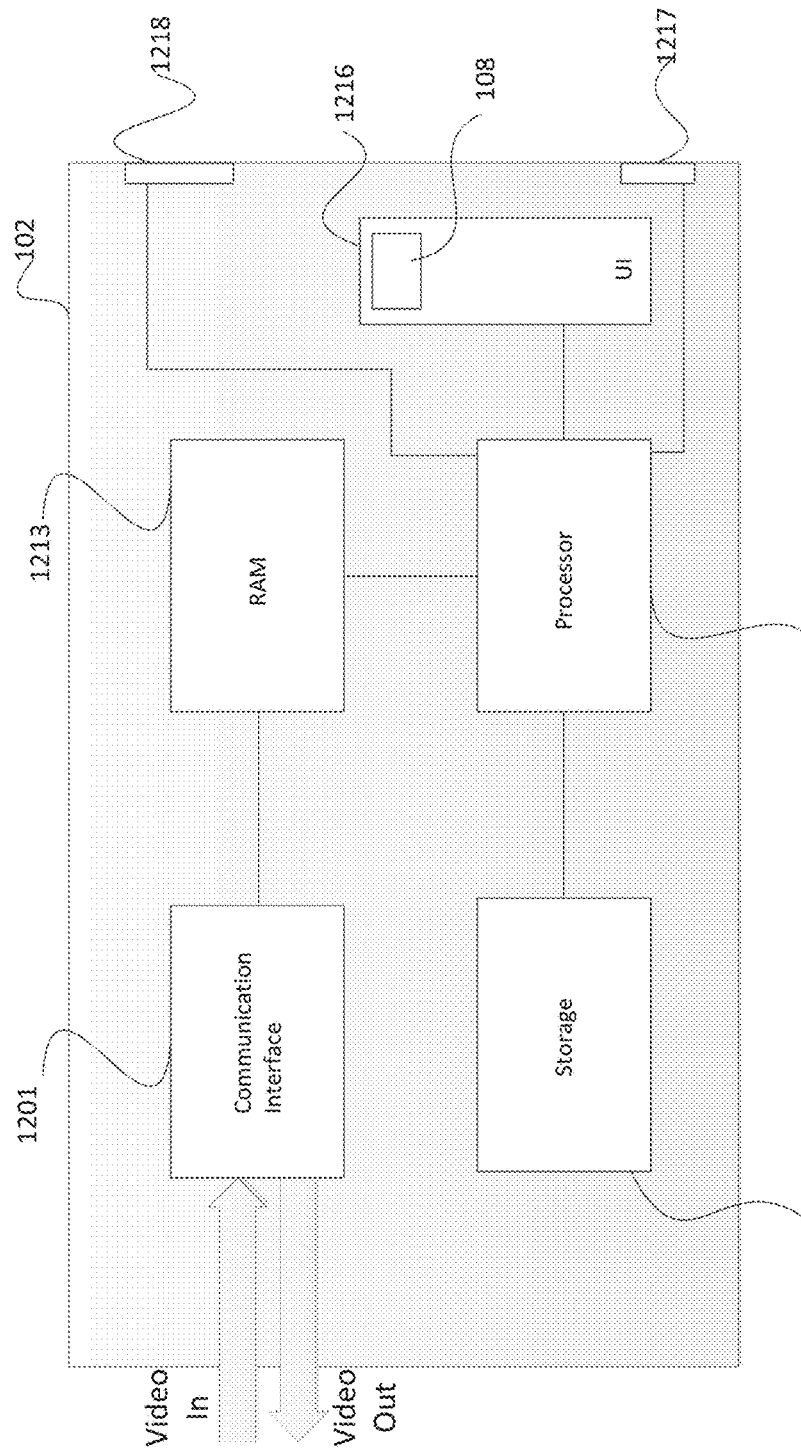
FIG. 12 illustrates an example computing device that can be utilized to implement various embodiments described herein.

In the discussion that follows, various sections describe various example embodiments. A section entitled "Video Messaging Application—Getting Started" describes how users can initially interact with a video messaging application in accordance with one or more embodiments. Following this, a section entitled "Annotating Video Thumbnail Representations" describes how video thumbnail representations can be utilized to annotate video message conversations in accordance with one or more embodiments. Next, a section entitled "Playback of Interconnected Video Messages" describes various aspects of how short video messages can be played back for a user in accordance with one or more embodiments. Following this, a section entitled "Single Action Stop Recording and Send" describes how short video messages can be sent in accordance with one or more embodiments. Next, a section entitled "Automatic Camera Selection" describes how a front-facing camera or a rear-facing camera can be automatically selected in accordance with one or more embodiments. Following this, a section entitled "Preemptive Processing" describes how certain aspects of message processing can be preemptively performed in accordance with one or more embodiments. Next, a section entitled "Emoticons and Pre-canned Responses" described how users may respond to short video messages that are received, in accordance with one or more embodiments. Last, a section entitled "Example Device" describes aspects of an example device that can be utilized to implement one or more embodiments. FIG. 12 shows components of an exemplary computing device 102 which can be implemented as any type of portable and/or computer device as described with reference to FIGS. 1 and 2 to implement embodiments of the video messaging application described herein. The device 102 comprises a communication interface 1201 which enables wired and/or wireless communication of data to and from the device. Of relevance to the described embodiments of the invention, the communication interface 1201 receives incoming video messages labelled video in and transmits outgoing video messages labelled video out. The communications interface 1201 provides a receiver and a transmitter for exchanging data from one or more other user terminal in the network, and can be constituted by wired or wireless modem for example for communicating data over the internet or a 3GPP network. The computer device 102 also comprises non-volatile storage 1214 such as one or more memory components, examples of which include non-volatile memory (e.g. anyone or more of a read only memory (rom), flash memory, e prom, ee prom, etc) and a disk storage device. A disk storage device may be implemented as any type of magnetic or optical storage device, such as a hard disk drive a recordable and/or rewriteable compact disk, any type of a digital versatile disk (DVD) and the like.

The storage 1214 constitutes computer readable media in which the code modules and applications referred to herein are stored, including the web platform 104, the gesture module 105 and the video messaging application 106 of FIG. 1. The computer device 102 includes one or more processors 1210 (e.g. any of microprocessors, controllers and the like) which process the computer executable or readable instructions from the computer readable media 1214 to control the operation of the device 102 and implement the embodiments described above. Alternatively or in addition device 102 can implemented with anyone or combination of hardware, firmware and fix logic circuit. The device 102 can include a system bus or data transfer system that couples the various components within the device. A system bus can include anyone or combination of different bus structures, such as a memory bus or memory controller, a peripheral bus, a universal serial bus and/or a processor or local bus that utilizes any of a variety of bus architectures.

The device 102 also comprises what is termed herein as local storage, for example a random access memory (RAM) 1213. The processor 1210 interacts with the RAM 1213 when executing the video messaging application, and is also available to provide buffering for ingoing and outgoing video messages through the communications interface 1201. It will be appreciated that in practice the buffering and storage functions for incoming and outgoing video may be provided within the communications interface itself, but it is convenient herein to describe them in relation to the RAM 1213 because of the interaction between the video messaging application and the video content to deliver the embodiments described herein. The computer device 102 also comprises a user interface under the control of the processor 1210. The user interface provides the display 108 which allows video content to be displayed to a user, together with the control functions for the user described herein. The device 102 comprises an audio output means, such as an audio jack to allow an audio signal to be consumed by a user. It would be appreciated that the video content which is described herein can be accompanied by corresponding audio content which can be played out at the same time. The audio output device is denoted 1217. The computer device also provides the cameras 113, 115 shown in FIG. 1 and not illustrated again in FIG. 12, and further provides an audio input device 1218 such a microphone.

The messaging application 106 is configured to receive video messages from a complimentary instance of the messaging application on another computing device which is connected via a network to the present computing device 102. One such other computing device is shown in FIG. 13 as 102A. Thus, the video messaging application can operate in a peer-to-peer arrangement where one instance of a messaging application on one device communicates directly with another instance of a messaging application on other device. In an alternative embodiment, a server (such as that implementing content services 212) can provide some functionality of the messaging application in which case the messages may originate from a sending user terminal sending the messages via the server and/or may originate from the server to a destination terminal.

The messaging application is configured to receive messages at the computer device and to store them in the storage 1213. The computer device 102 can operate as a sending (source) user terminal, or as a receiving (destination) user terminal, and in a typical video message conversation it will be performing both roles.

In the following description it is assume that the video messaging service is constituted by a video messaging application on each of the sending and receiving terminals, and a "back end" application implemented at a server. Nevertheless, as mentioned, peer-to-peer implementations are possible. FIG. 13 illustrates a schematic architecture showing a sending computing device 102 in communication with the receiving computing device 102*a* via a network 211. The server which provides the content services 212 is denoted 203.

Having described example operating environments in which the inventive principles can be employed, consider now a discussion of various embodiments.

Video Messaging Application—Getting Started

In one or more embodiments, the video messaging application is designed to enable asynchronous video communication in a manner that is "lightweight" and, from a user's perspective, fast and easy to use. The application itself, in one or more embodiments, has two main screens. A first of the screens visually lists the video message conversations in which the user is currently taking part. The second of the screens enables the user to select a particular video message conversation and have its contents displayed in the second screen. The screens are rendered in the display 108 when the application 106 is opened. In this manner, a simple user interface is provided which promotes ease of usability.

In one or more embodiments, the video messaging application is based on the use of phone numbers. For individuals who appear in a user's contact list, associated phone numbers may be resolved from names or contact information appearing in the user's contact list. This can permit a user to communicate with anyone in their phonebook or contact list, as well as people who may not appear in their phonebook or contact list. Thus, this solves one of the barriers associated with VoIP communication which requires the exchange of contact information between users through a user interface.

In one or more embodiments, when a user starts the video messaging application for the first time, a simple phone number-based challenge can be issued to ensure that the user is the actual owner of that phone number. This can take place in any suitable way including, for example, using well-accepted SMS code challenge techniques. Once completed, the video messaging application can be opened by the user and the user can be presented on the display 108 with a welcome video explaining the various application features and functionality. The user can then start a video message conversation by simply selecting a contact or providing a phone number of an individual with whom they wish to converse. The user can then record a short video message and have it sent to the recipient. Recording of the video is done in a way which is known to users of these devices. A chosen camera 113 or 115 is pointed at the subject to be videoed, a record function is activated (as described in more detail later) and the camera records the video. The processor 1210 causes the video data which has been captured by the camera to be stored in the RAM 1213 or other "local" storage.

In cases where an intended recipient does not have the video messaging application installed on their device, an SMS message can be sent with a link that indicates that the sender of the message is using a video messaging application. The SMS message can indicate that the sender has recorded a short video message for the recipient and can indicate that by clicking on the link, they can effectively install the video messaging application. When the user clicks on the link, they can be navigated to an application store from which they can download the video messaging application. Once the application is downloaded, the recipient can then view the short video message and reply accordingly Having considered how the video messaging application can be initially accessed by a user, consider now some user interface aspects associated with video message conversations.

Annotating Video Thumbnail Representations

As discussed above, a video message conversation allows participants in the video message conversation to exchange short video messages with one another. The concept of a conversation is itself well understood in the field of messaging applications. A conversation is a logical thread of content, arranged under the same conversation ID used by the messaging application (though the users need not be aware of the ID). Following the first message of a conversation, each subsequent message is deemed part of the same conversation as it is entered as such by the sending user in a part of the user interface of his or her messaging application which represents the conversation in question. The subsequent message is typically a response to or relates to a preceding message of the conversation, though potentially a user could send a completely unrelated message as part of the same conversation. Recording of a video is known by itself, in that one of the cameras 115 or 113 is pointed at a subject and records video data for a period to capture a video stream of the subject. This video stream can be stored locally in RAM 1213 or transmitted directly to the server 103 or receiving terminal 102A. In accordance with embodiments of the present invention, there are some important differences which arise. Firstly, only short video messages will be enabled. That is, recorded videos are of a maximum permitted length, and the recording function is automatically terminated at that time. Furthermore, while a message is being recorded it can be stored locally on RAM 1213 and/or additionally be simultaneously transmitted to the server 103 where it is stored for ongoing delivery to the receiving terminal as will be described in more detail hereinafter. Conversations can be stored locally at the sending and receiving devices (in RAM 1213) in association with their respective IDs, or at the server 103. At times, a video message conversation additionally allows an exchange of text messages. A video message conversation can be as simple as an exchange of short video messages between two participants, or can be more complex and involve an exchange of short video messages between three or more participants. Thus, a video message conversation allows participants to send and receive multiple short video messages with one another. In some cases, a particular user can engage in multiple video message conversations with multiple different participants. Depending upon the responsiveness of the user, as well as how active each video message conversation is (e.g. whether short video messages are actively being exchanged or not), the multiple video message conversations can be in varying states from one another. In turn, this can make the management of multiple video messages conversations cumbersome to the user. For example, the user may have some video message conversations with unconsumed content or content that has not been viewed. Further, the user may have trouble remembering who is participating in the video message conversation, or may be unsure whether contact information of a participant has been stored for future access.

Various embodiments provide an ability to visually annotate one or more statuses associated with a video message conversation. For example, in some embodiments the application can annotate whether a video message conversation has a status associated with unconsumed and/or unviewed short video messages. At times, a video message conversation can be represented using a thumbnail video image. A visual annotation can be associated with the thumbnail video image to convey one or more status of the video message conversation, such as by superimposing the annotation over the thumbnail video image. Alternately or additionally, the thumbnail video image can be generated based, at least in part, on a received short video message in the respective video message conversation, as further described below.

Figure 3:
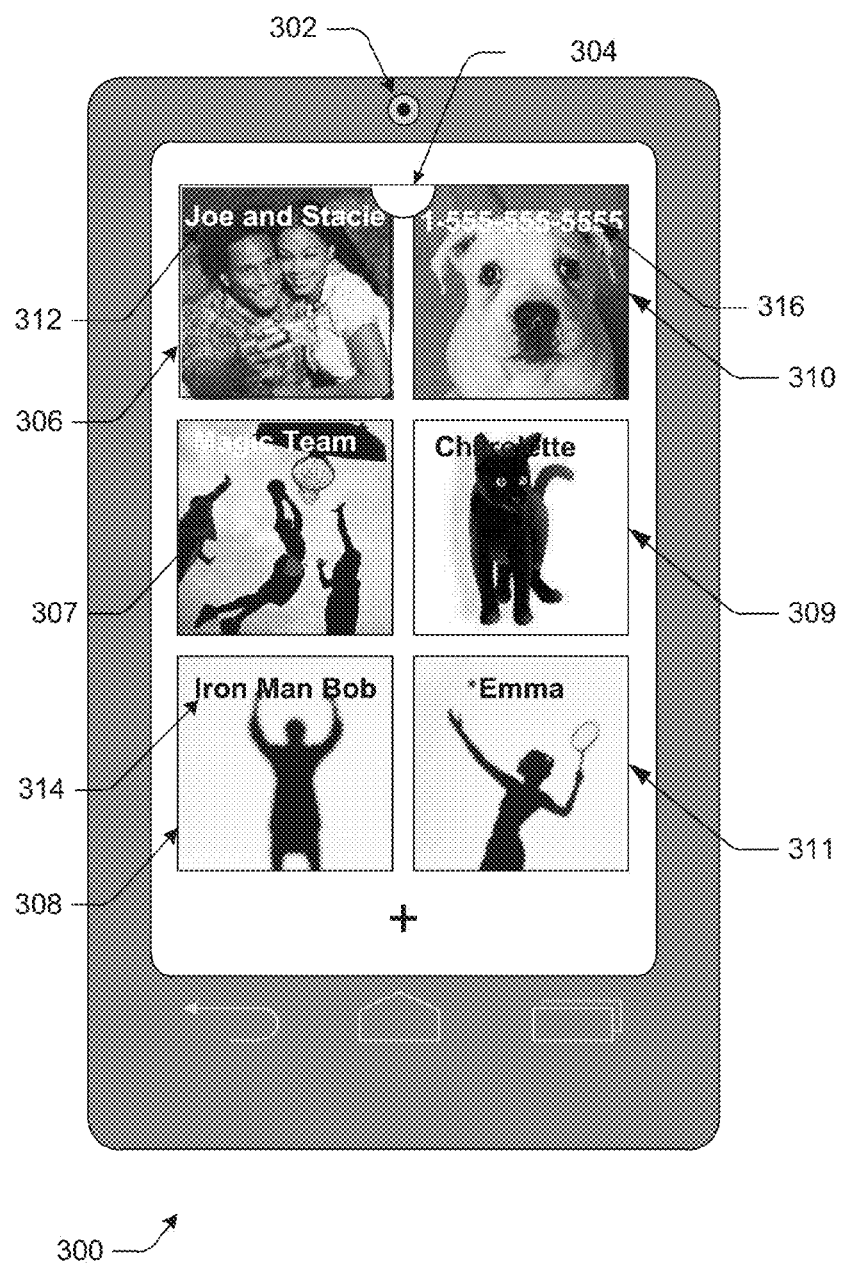
FIG. 3 is an example implementation in accordance with one or more embodiments.

Consider FIG. 3, which illustrates an example implementation in accordance with one or more embodiments. FIG. 3 includes device 300, which can be any suitable type of device, such as computing device 102 of FIGS. 1 and 2. In this example, device 300 is illustrated as a mobile phone device, but it is to be appreciated that any suitable type of computing device can be utilized without departing from the scope of the claimed subject matter.

Among other things, device 300 includes an ability for a user to participate in video message conversations. For example, as discussed above, video messaging application and/or plug in with video message conversation capabilities can be installed on device 300. A plug in communicates with a backend which executes the messaging application. The video messaging application can subsequently either be automatically launched or selectively launched. As noted above, device 300 also includes one or more cameras 115, 113 and/or audio input devices 1218 (FIG. 12), shown generally here together as input device 302 for the sake of brevity. While illustrated here as a combined input device, it is to be appreciated that device 300 can include separate cameras and audio input devices placed in any suitable position without departing from the scope of the claimed subject matter. In some embodiments, device 300 can include a first camera facing a user of device 300 (i.e. a front-facing camera) and a second camera facing out from the back of device 300 (i.e. a rear-facing camera). It is to be appreciated and understood that cameras other than front-facing and rear-facing cameras can be employed without departing from the spirit and scope of the claimed subject matter. For example, multiple cameras that face different directions can be used, e.g., front and side cameras, back and side cameras, different side cameras, more than two cameras facing different directions, and the like. How a user interacts with device 300 can, at times, influence which camera captures video and/or how the captured video is inserted into a video message conversation, as further described below. For instance, device 300 can include selectable controls, such as viewfinder 304, that a user can interact with to trigger video capture and/or camera selection.

In this example, the application 106 has engaged in several conversations with different users, each of which is stored against its conversation ID. The application 106 selects a number of conversations for display. A representation is generated for each message by the application 106 at the sending device. Each conversation comprises multiple stored short messages held in the memory 1213, each with an associated thumbnail. The device 300 displays separate representations of six video message conversations that are associated with a particular user. While display 300 is illustrated as displaying six video message conversation representations, it is to be appreciated that this number is merely for discussion purposes, and that any suitable number of video messages can be displayed. In some embodiments, a user can scroll and/or move the currently displayed representations to access and/or view additional video message conversations. For example, when device 300 includes touch screen input capabilities, a user can input a touch gesture associated with scrolling and/or moving images. Alternately or additionally, the user can input similar scroll commands via any type of input mechanism, such as a keyboard, a mouse, soft keys, and so forth. In one embodiment, the representation for a video message conversation is the thumbnail for the most recently added message to the conversation. The representation could take the form of any other suitable designation, such as an icon, an emoticon and/or a still image. A thumbnail video image can include animation, video, and/or snapshots of images associated with the video message conversation, as further described below.

In some embodiments, representations of video message conversations can be separately annotated to convey respective status(es) of the associated video message conversation. To begin with, different types of representations can be used for the different video message conversations to convey different statuses. Here, the displayed representations for video message conversations include representations 306, 307, 308, 309, 310, and 311. In this example, representations 306 and 308 are still images, [How are the stills generated] while representation 310 is a thumbnail video image. Among other things, this difference and/or annotation can be used to visually convey to the user that the video message conversation associated with representation 310 has unviewed content, while all content contained in the video message conversations associated with representations 306 and 310 has been viewed and/or consumed. However, as described above, any suitable representation can be used without departing from the scope of the claimed subject matter.

Additionally in this example, representations 306, 308, and 310 are superimposed with annotations 312, 314, and 316 respectively. In this example, the annotations are illustrated as text strings with different display properties from one another. For example, annotation 312 includes the string "Joe and Stacie" using white text, while annotation 314 includes the string "Iron Man Bob" using black text. As in the case above, these visual differences can be used to convey that the status of the video message conversation associated with representation 306 is different than the status of the video message conversation associated with representation 308. For example, the black text of status annotation 314 can also be used to convey that the video message conversation associated with "Iron Man Bob" has unviewed and/or unconsumed content. Further, the text term "Iron Man Bob" can convey a name assigned to the video message conversation and/or simply a participant who has sent a short video message in the video message conversation. Similarly, the white text of annotation 112M can be used to convey that all of the short video message and/or content associated with the corresponding video message conversation have been viewed and/or consumed. Another form of annotation can comprise changing the background color or wash of the displayed representation. For example, a grey wash can indicate that the video message conversation comprises only consumed or viewed content, while a brighter blue wash can denote that the conversation contains unviewed or unconsumed content.

Figure 14:
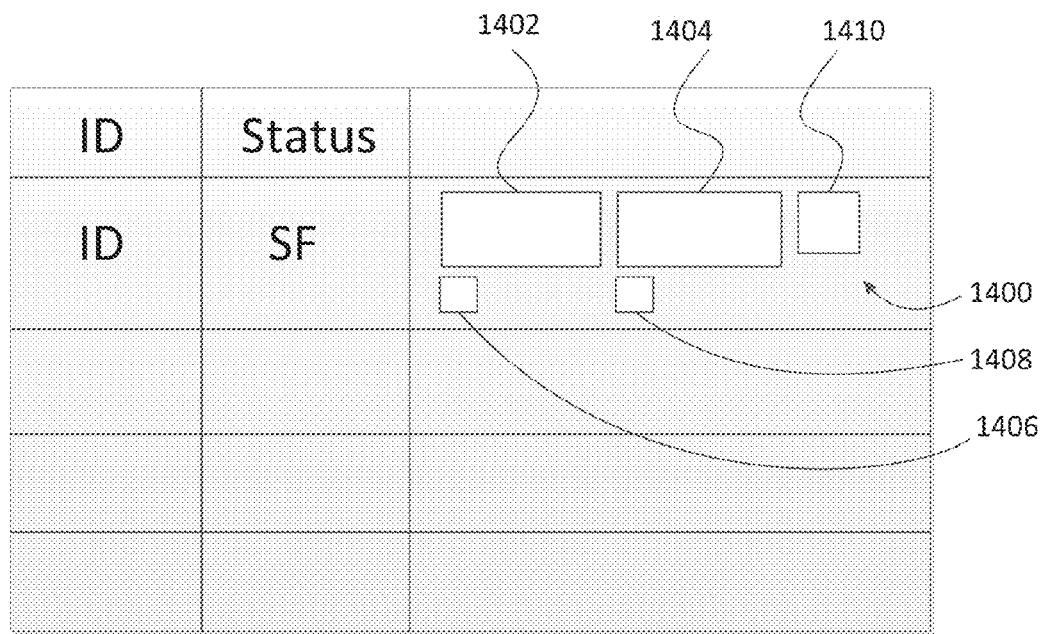
FIG. 14 is a diagram of a store holding a video message conversation.
Figure 15:
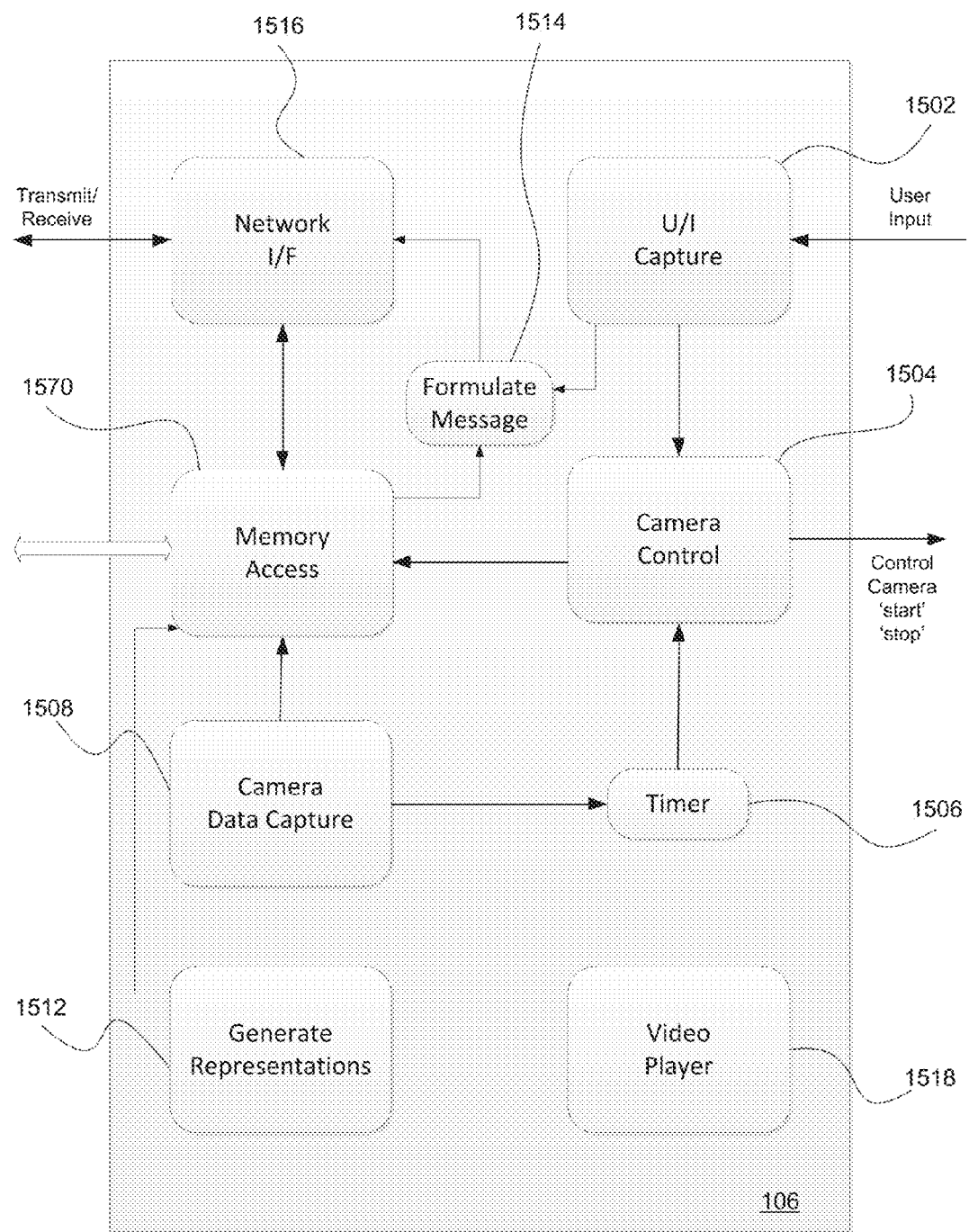
FIG. 15 is a schematic diagram of software components within the video messaging application.

FIG. 14 is a schematic diagram of one way in which a video message conversation can be stored in a memory, such as RAM 1213. It will readily be appreciated that video message conversations can be stored in a backend server or the like to be accessed by devices in a cloud based model. Thus, references herein to "local" storage encompass storage at a local device, or storage remote from the device but which is associated with the device, such that the contents of the storage are accessible to be device.

A video message conversation 1400 is shown to contain two video messages 1402, 1404. It may be assumed herein that the message 1402 was generated by the sending device, and the message 1404 has been received at the sending device from the recipient device of the first message. Each message is associated with a thumbnail 1406, 1408 respectively. The thumbnail was generated when the video message was completed by the sending device. The video message conversation is associated with an identifier labelled ID, and also with a status flag labelled SF. The status of the status flag is changed when content is read from the video message. When all content has been read, the status flag marks the video message conversation as "read", and this flag is utilized by the application 106 to perform the necessary status annotation when the representation of the message is displayed to the user at display 108.

Continuing on, annotation 316 includes the string "1-555-555-5555" using white text. Here, the numerical number and/or phone number that is displayed can be used to indicate that contact information associated with the participant who sent the video clip is not currently stored in an address book and/or contact information of the receiving user. Thus, visual annotations can be utilized to convey any suitable type of status information associated with a video message conversation, such as a new video message conversation has been received, a video message conversation is expiring, a video message conversation has new and/or unviewed video clip content, contact information has not been stored, a mood associated with the sending user (e.g. an emoticon), and so forth. Further, annotations can be displayed using any suitable type of content, such as an emoticon, text and its associated properties (e.g. bold, italic, color, etc.), icons, and so forth. Alternately or additionally, video messages conversations with unconsumed and/or unviewed content can playback thumbnail video images or a different animation to indicate the status of unconsumed content, while video message conversations whose content has been completely viewed simply display a still image.

In addition to annotating a representation of a video message conversation, some embodiments can use positioning of the representations to convey status information. For example, the order in which the representations are placed can indicate which video message conversations have older content and/or newer content. Alternately or additionally, the order in which the representations are placed can indicate which video message conversations have been viewed more recently. Here, representation 306 is illustrated as being in the upper left hand corner, followed by representation 310 to its immediate right. Among other things, this placement can indicate that the video message conversation associated with representation 310 includes newer content and/or more recently viewed content than the video message conversation associated with representation 306. Visually, this ordering follows a similar structure to a paragraph, where the starting point is at the top left hand corner of a paragraph, and words are read from left to right, until the bottom of the paragraph is reached. Using this structure, the placement of representation 308 indicates that the associated video message conversation has either newer content and/or and content viewed more recently than the video message conversations associated with representations 306 and 310. Thus, status information can additionally be conveyed through placement in/ordering of the representations.

Some embodiments use a thumbnail video image as a representation for a video message conversation. At times, the thumbnail video image can be based upon a video clip composed of multiple frames from the short video message or video message conversation.

Figure 4:
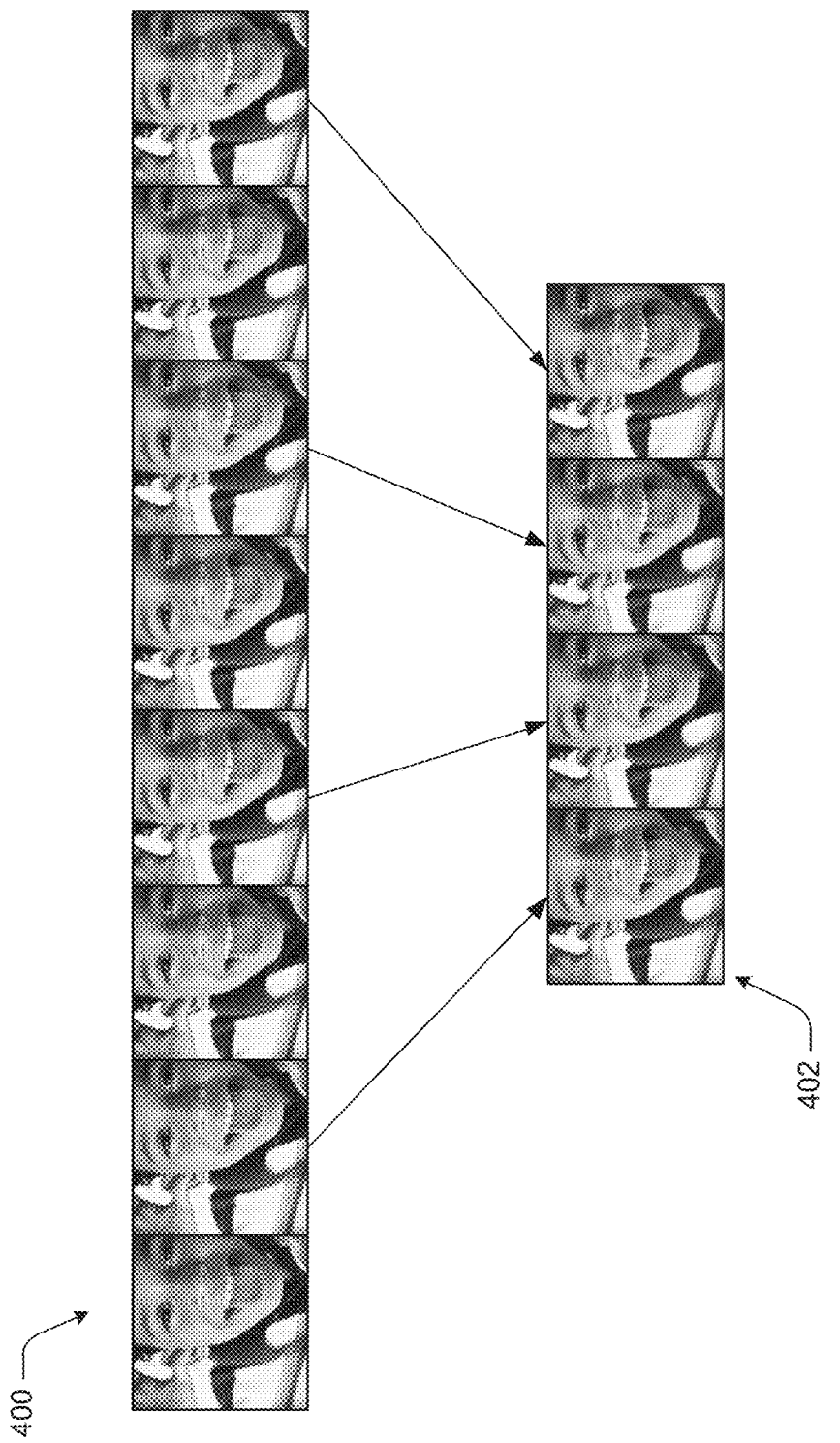
FIG. 4 is an example implementation in accordance with one or more embodiments.

Consider FIG. 4, which illustrates an implementation that is in accordance with one or more embodiments. Here, video clip 400 generally represents a portion of video from a short video message prepared by a participant in a video message conversation. It is to be appreciated that the application 104 can comprise a video clip 400 from any suitable collection of frames in the video message conversation, such as the most recently received frames, the first frames received, frames associated with a particular user in the video message conversation, and so forth. When the video player in the messaging application plays back the video clip, the series of frames are played in rapid succession, thus generating a video which captures potential changes in movement and/or content over time. A thumbnail video image can be generated from gathering a subset of the frames effective to create a shorter version of the received video clip. Any suitable algorithm and/or image selection process can be utilized. Here, thumbnail video image 402 is simply generated from video clip 400 by extracting every other still frame from the source video clip (e.g. video clip 400). However, it is to be appreciated that this simple selection metric is merely for discussion purposes. Other suitable selection metrics can be utilized to generate the thumbnail video, such as selecting frames for a predetermined amount of time from the beginning of the source video clip, selecting frames for a predetermined amount of time from the end of the source video clip, selecting frames based upon a fixed time interval, selecting a predetermined number of frames at equal intervals regardless of a short video message length (i.e. selecting 5 frames equally spaced), selecting frames based upon identifying content of interest, and so forth. For example, a face recognition algorithm could be used to analyze the source video clip to determine when a video has captured a facial image. When a facial image is determined, associated frames (and surrounding frames) could be extracted and/or copied effective to generate a thumbnail video image. Thus, detection algorithms can be used to ensure that the thumbnail video image contains content of interest to the recipient, such as a friend's face, rather than an empty room. In one embodiment, the application 106 is configured to generate a thumbnail video using an appropriate selection metric when the message is recorded. In one embodiment, the metric can be configured by a user. In another embodiment (FIG. 5), the representation is generated by the receiving device.

Once a thumbnail video image has been generated, it can be used to represent a video message conversation, such as representation 310 of FIG. 3. When displaying these representations, in some embodiments the video player automatically playsback the collection of images contained within the thumbnail video image. This automatic playback can be configured in any suitable manner, such as a repeat loop, where the playback continues repeatedly from the start of the thumbnail video image to the end for an undetermined number of repeats, for a set number of repeats, and/or for a single playback. Alternately or additionally, the thumbnail video image can be configured to play based upon the user activating an associated playback control for the thumbnail video image.

Figure 5:
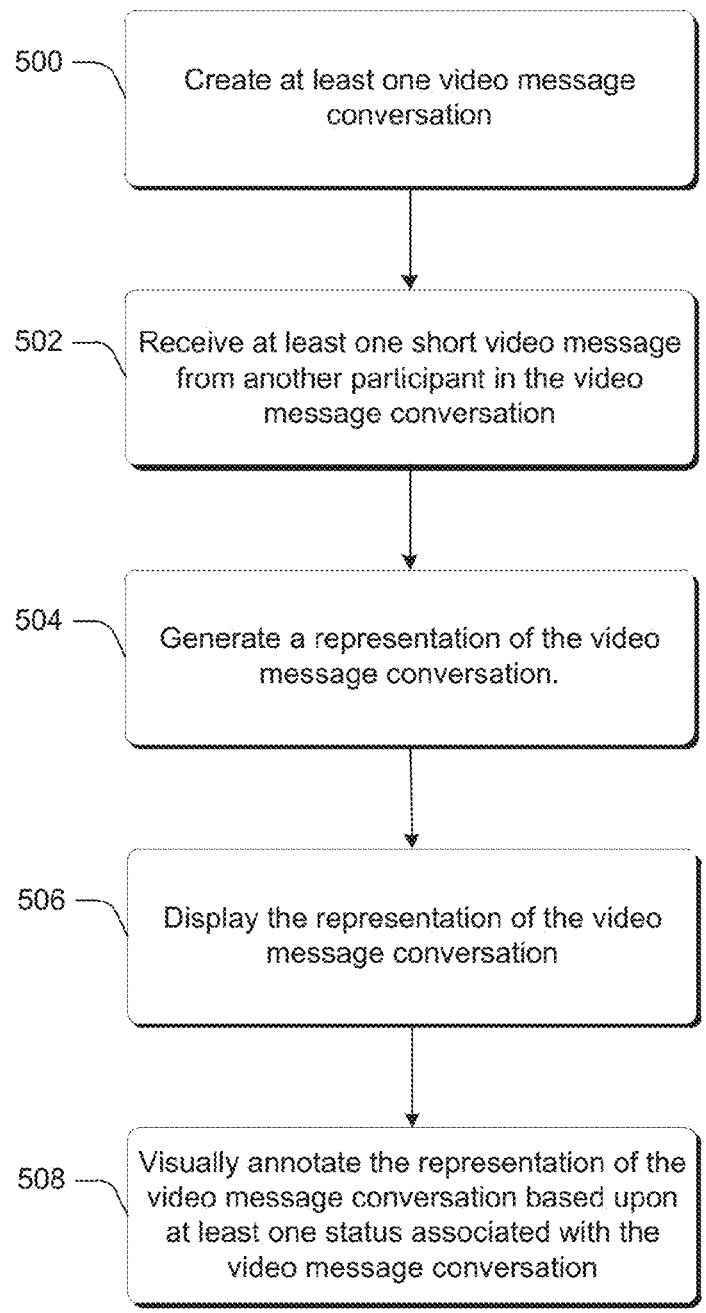
FIG. 5 is a flow diagram that describes steps in a method in accordance with one or more embodiments.

FIG. 5 is a flow diagram that describes steps in a method in accordance with one or more embodiments. The method can be implemented in connection with any suitable hardware, software, firmware or combination thereof. In at least some embodiments, aspects of the method can be implemented by a suitably configured voice messaging application, such as voice messaging application 106 (FIG. 1).

Step 500 creates at least one video message conversation associated with a user. In some embodiments, creating a video message conversation involves the user at device 102 receiving a notification, data, and/or a message initiated by at least a second user at device 102A in the video message conversation effective to create a new video message conversation with the user as a participant. This can be as simple as receiving an initiation message, or as complex as being invited to join a conversation and going through subsequent authentication procedures to validate the user as a participant in the video message conversation. In other embodiments the user, by way of the voice messaging application, can create the video message conversation by initiating and sending data, such as a short video message, to other users to create a new video conversation message on their associated devices. As described above, the video message conversation can be as simple as an exchange of short video messages between two participants, or more complex and involve an exchange of short video messages between three or more participants. Alternately or additionally, a user can be a participant in multiple video message conversations.

Step 502 receives at least one short video message from another participant in a video message conversation. The short video message can be of any suitable data size and/or playback length in time. In some cases, short video messages can be received from multiple participants. Video messages are received by the communication interface 1201 of the device and stored in the local memory e.g. RAM 1213.

In one embodiment, responsive to receiving the short video message, in step 504 the application generates a representation for the video message conversation. In some cases, a respective representation is generated for each video message conversation associated with the user. As discussed above, generating a representation can include generating a thumbnail video image based on a received short video message and/or generating a still [from where?] image. In some embodiments, generation of the representation can be based on a user changing screens in an application, as further described below. For example, the voice messaging application can, among other things, facilitate creating, deleting, and viewing multiple video message conversations associated with a user. The user may desire to switch screens in the voice messaging application from a screen associated with a particular video message conversation to a screen associated with a summary of active and/or idle video message conversations associated with the user. Switching to the summary screen can, in some cases, trigger generation of the representation. In other cases, the representation is automatically generated in anticipation of switching to the summary screen at a future time. When a user interacts with the display 108 to switch screens, a signal is generated to the application 106 to trigger generation of the representation, or to display a representation which was generated at the sending device.

In Step 506 the application 106 displays the representation of the video message conversation on display 108. Any suitable representation can be utilized, examples of which are provided above. In some cases, multiple representations of respective video message conversations can be displayed in a summary view, as further described below. In order to display the representation of the video message conversation, in step 508 the application 106 visually annotates the representation of the video message conversation based upon at least one status (FC) associated with the video message conversation. The annotation can be configured to convey one status or multiple statuses. In some case, multiple annotations can be used, such as a text string being displayed in parallel with an icon and/or emoticon. Thus, not only can a user be a participant in multiple video message conversations, but representations of each associated video message conversation can be displayed and annotated to convey status information of each respective conversation.

Having described various embodiments of annotating representations of video message conversations, consider now playback of associated short video messages in a video message conversation that is in accordance with one or more embodiments.

Playback of Interconnected Video Messages

As discussed above, a video message conversation can include multiple short video messages or pre-canned/preprepared messages. As a user enters into a video message conversation, they may desire to view part and/or all of the associated videos in a seamless manner (i.e. contiguous viewing without user intervention). Various embodiments provide an ability for a user to seamlessly playback multiple short video messages exchanged in a video message conversation. For example, some embodiments enable a user to configure a video message application to play a single short video message in a video message conversation, or to contiguously (i.e. seamlessly) playback at least part of the associated short video messages. To enable a user to configure this, the application presents an option to a user on the display 108 which a user can select. The contiguous playback enables multiple short video messages to be played together, without requiring user intervention to select and play each individual one separately. For example, when the video message application is configured in a contiguous playback mode, a first short video message of the video message conversation can be selected for playback by the video player. Upon the conclusion of the selected short video message being played, a second short video message of the same video message conversation is automatically started for playback by the video player, and so on. To achieve this, the video player selects the received message in the same conversation based on the conversation ID. In addition, the video message conversation can include, in addition to short video messages, preprepared videos 1410 (FIG. 14) that may not necessarily be recorded by a participant. These videos can include, by way of example and not limitation, precanned videos as described below. A standard video message is recorded live and sent once and lasts up to 42 seconds, in one embodiment. Pre-recorded replies are recorded, saved in a gallery and can be sent as many times as you like and they last 5 seconds.

Figure 6:
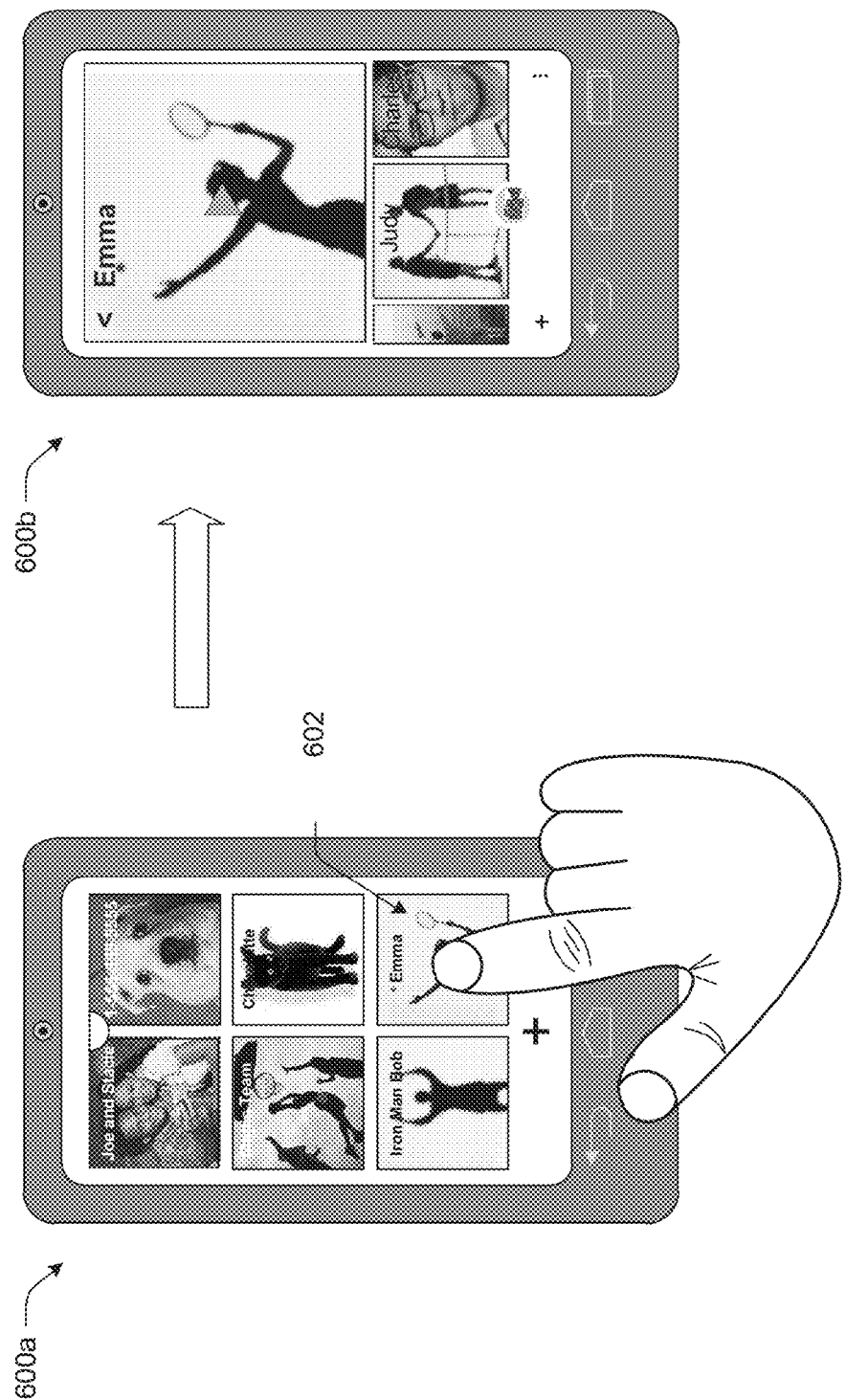
FIG. 6 is an example implementation in accordance with one or more embodiments.

Consider now FIG. 6, which illustrates an example computing device in accordance with one or more embodiments. Here, the computing device is illustrated at two different points in time, each designated 600*a* and 600*b*, respectively. Point in time 600*a* illustrates a first screenshot, and point in time 600*b* illustrates a second screenshot. The first screenshot is illustrated as displaying a summary view of video message conversations associated with a particular user. In some embodiments, when a user wants to enter into a particular video message conversation (i.e. view content associated with that particular video message conversation), they can begin the process by selecting which video message conversation they wish to view. While reviewing this summary, the user may notice that the video message conversation associated with representation 602 (entitled "Emma") has unviewed and/or unconsumed content, and may wish to view its associated content. Utilizing touch screen capabilities, the user touches the screen over representation 602 as illustrated. Upon receiving this input, the associated voice messaging application 106 switches what is displayed on the screen to display information particular to the video message conversation associated with representation 602, as shown in the second screenshot. While this example is described in the context of inputting commands via a touch screen interface, it is to be appreciated and understood that any suitable type of input mechanism can be utilized without departing from the scope of the claimed subject matter.

Figure 7:
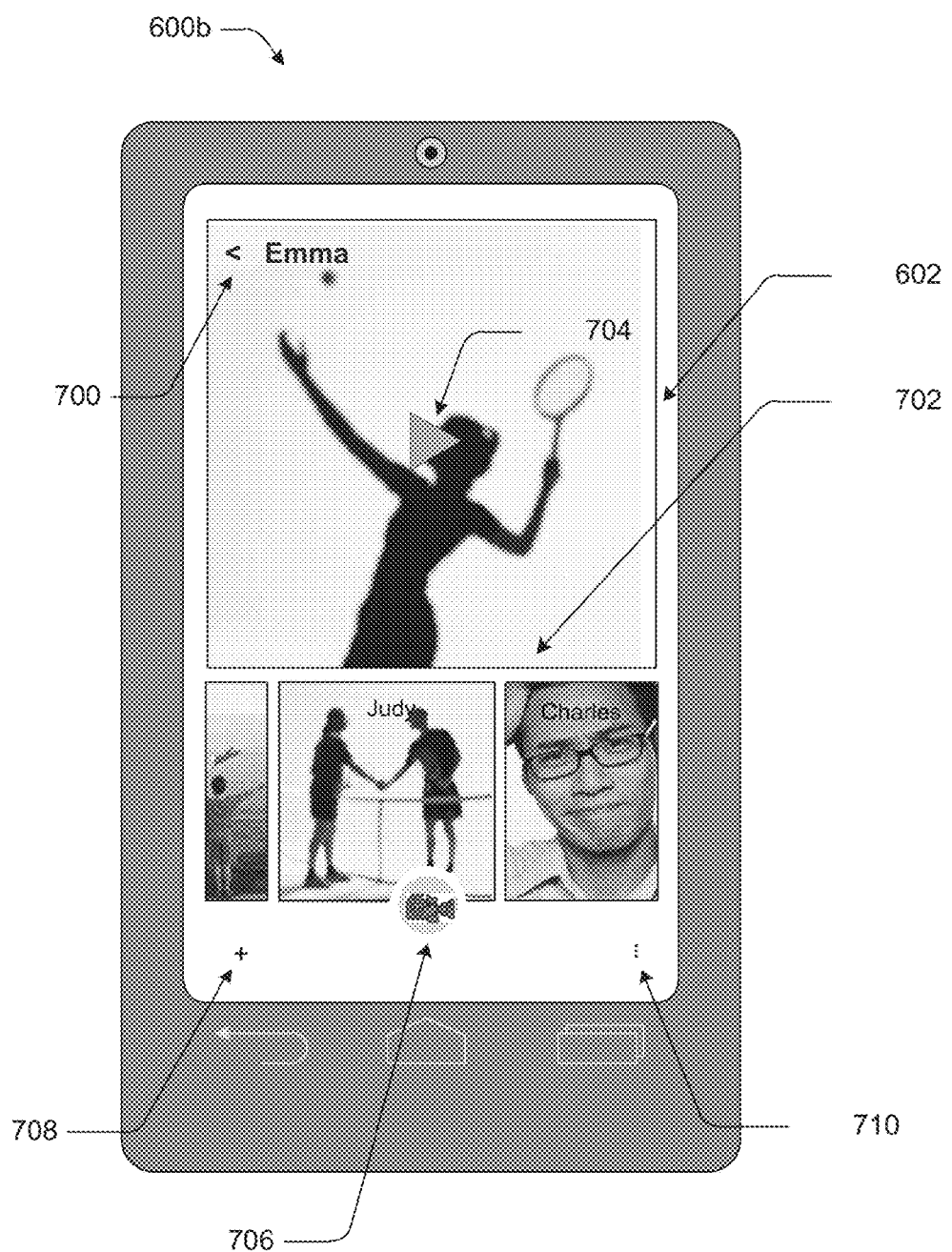
FIG. 7 is an example implementation in accordance with one or more embodiments.

FIG. 7 illustrates a more detailed view of the second screenshot. There, summary information associated with a particular video message conversation is displayed. In this video message conversation summary view, the current short video message to be played is located in a prominent position (e.g. a position that is more viewable and/or visible than other locations). Here, representation 602 is located near the top of the device and is larger than it was in the first screenshot. Alternately or additionally, this location can be configured to display the actual short video message associated with representation 602 in a paused, unstarted/stopped state, or simply as a still frame extracted from the short video message.

In some embodiments, representation 602 can include annotation 700 to indicate status information associated with the short video message as further described above. Alternately or additionally, annotation 700 can be configured as a selectable control. For instance, the left pointing arrow in annotation 700 can be selected to navigate to a previous screen (such as the first screenshot).

Beneath representation 602 appears a so-called filmstrip 702. The filmstrip includes at least a partial summary of additional content included in the video message conversation. In some cases, the filmstrip displays representations of associated short video messages 1402, 1404 that make up the particular video message conversation. Alternately or additionally, these representations can include annotations to indicate associated status information. Status information can additionally be indicated by using the ordering of how the representations in filmstrip 702 are displayed, such as which short video messages have been viewed in the video message conversation, the order in which short video messages were received, and so forth. To aid in viewing this content, some embodiments configure filmstrip 702 as a navigable filmstrip (e.g. with scrolling capabilities) in order to see what short video messages are included in the video message conversation. Each representation can be selected to enable the video player to implement contiguous playback of the selected short video message and those that follow from that point forward. Any suitable input can be used to initiate these actions, examples of which are provided above and below.

In addition to displaying summary information associated with a particular video message conversation, the illustrated screenshot can additionally include selectable controls that enable the user to interact with the video message conversation and/or the video message application. In the illustrated example, controls 704, 706, 708, and 710 are displayed as part of the video message conversation summary display. It is to be appreciated that the inclusion of these particular controls are merely for discussion purposes, and that any combination of controls with varying functionality can be included without departing from the scope of the claimed subject matter.

Control 704 can be configured to start playback of one or more short video messages in the video message conversation. In some embodiments, selection of control 704 can initiate contiguous playback of multiple short video messages in the associated video message conversation. Control 706 can be utilized to initiate a video recording session to generate a short video message for insertion in the associated video message conversation. Controls 708 and 710 can be used to access further functionality associated with the video messaging application, such as creating a new video message conversation, adding a new participant to the active video message conversation, configuring default settings and/or user settings of the video messaging application, and so forth. When a control is activated a corresponding signal is sent from the UI 1216 to the processor 1210 execute the application 106, such that the application 106 can respond to the control.

Figure 8:
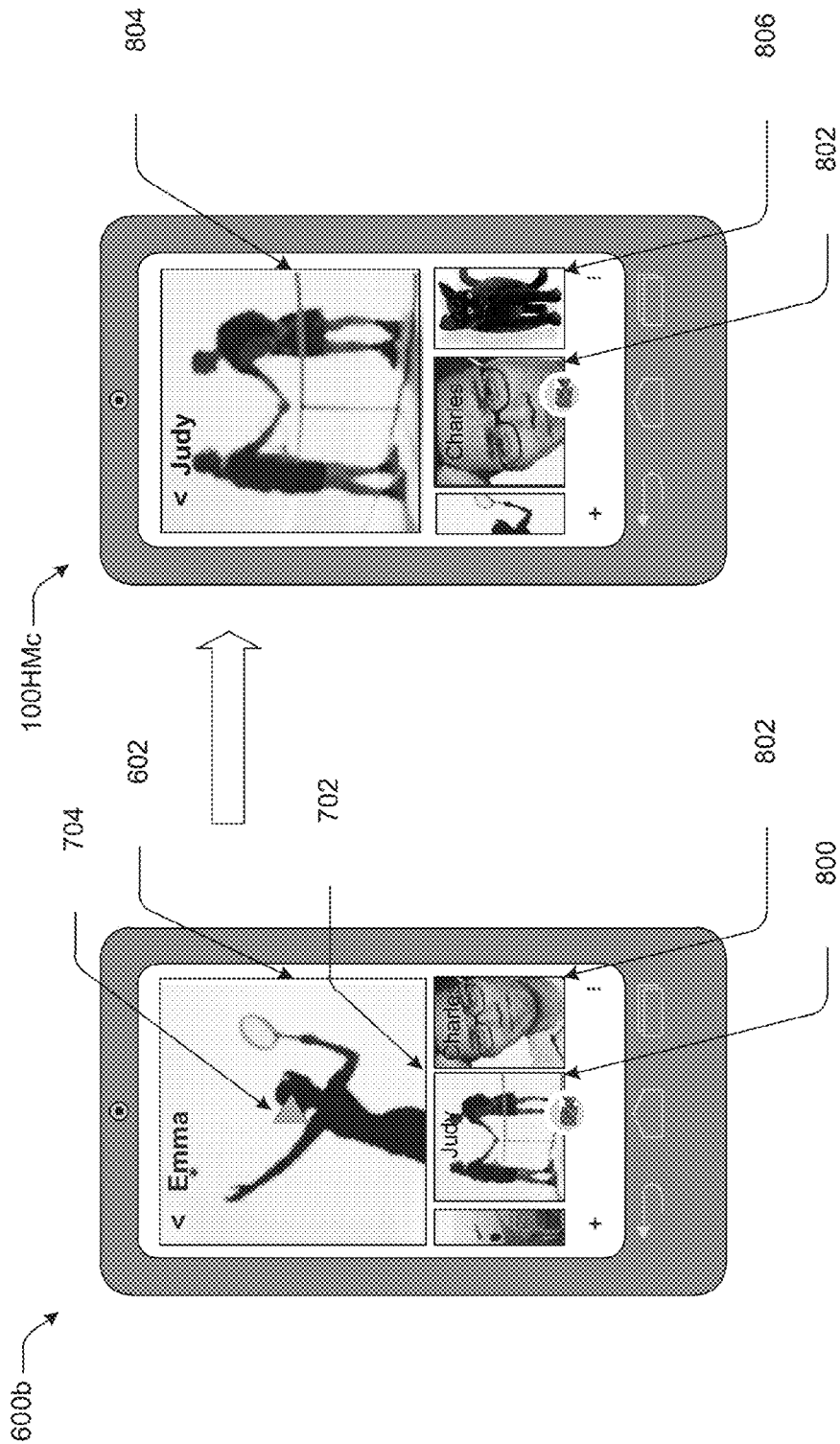
FIG. 8 is an example implementation in accordance with one or more embodiments.

To further illustrate, consider FIG. 8 which illustrates the computing device in a contiguous playback mode. The contiguous playback mode can either be a default configuration of the video message application, or a user-selected configuration. When a user selects control 704, playback of the short video message associated with representation 602 is initiated. As part of the playback process, control 704 can be removed from the display for unobscured viewing. Based upon each representation's location in filmstrip 702, a user may observe that the short video message associated with representation 800 is the first short video message received after the short video message associated with representation 602, followed by the short video message associated with representation 802a. Thus, upon completion of the currently playing short video message (i.e. the short video message associated with representation 602), some embodiments automatically play the short video message associated with representation 800. This is indicated by screenshot 100 HMc. Here, the short video message 804 assumes the primary viewing position in the topmost location with the biggest dedicated viewing area, and its playback is automatically started. Additionally, representation 802a is moved in filmstrip 702 into the position previously occupied by representation 800. This movement can be used to indicate that the associated short video message of representation 802 is next in the list to be played automatically. If another short video message has been received after the short video message associated with representation 802, its representation would visually move as well, indicated here by the appearance of representation 806.

In some embodiments, filmstrip 702 can be navigated to select a starting short video message. For example, in some cases, filmstrip 702 can be navigated to a starting point to identify the first short video message received in time (regardless of whether there is unviewed content), to an ending point that identifies the last short video message received in time, or any point in between. Thus, a user can navigate to any short video message and begin seamless, contiguous playback of multiple short video messages from that point forward. In some cases, the playback of short video messages can be configured to only automatically playback certain short video messages. For example, in some embodiments, only short video messages with a status of being unviewed are automatically played back in a contiguous manner, or only short video messages associated with a particular sender are automatically played back in a contiguous manner. In other embodiments, all short video messages associated with the video message conversation can be contiguously played back. These can be played in any determined order, such as having unviewed short video messages being played back first, and then continuously playing back viewed short video messages after completing playback of the unviewed short video messages.

Figure 9:
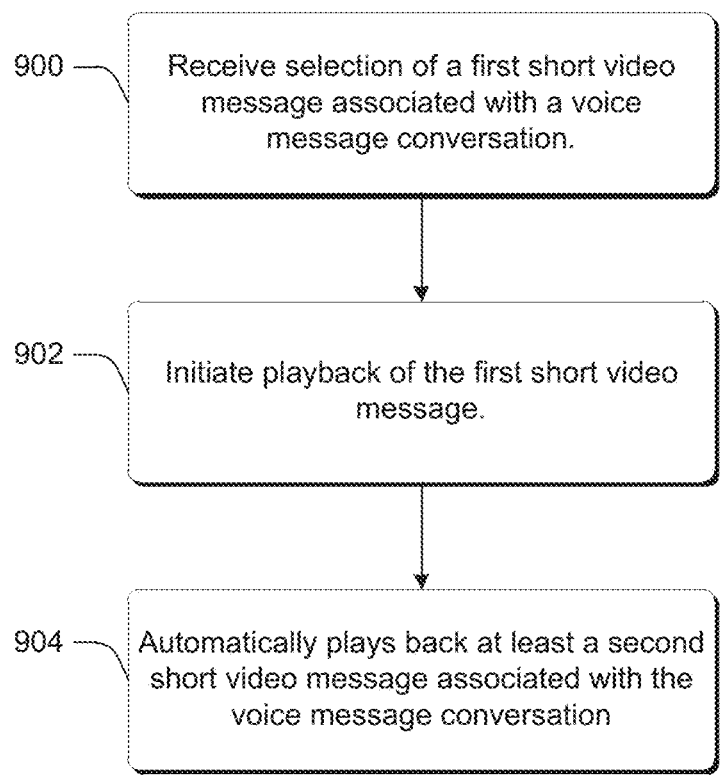
FIG. 9 is a flow diagram that describes steps in a method in accordance with one or more embodiments.

FIG. 9 is a flow diagram that describes steps in a method in accordance with one or more embodiments. The method can be implemented in connection with any suitable hardware, software, firmware or combination thereof. In at least some embodiments, aspects of the method can be implemented by a suitably configured voice messaging application, such as voice messaging application 106 (FIG. 1).

Step 900 receives selection of a first short video message associated with a video message conversation. The video message conversation can include multiple short video messages, as described above. Further, selection of the first short video message can occur in any suitable manner. In some embodiments, the first short video message can be automatically selected by the video message application upon entering and/or viewing the associated video message conversation. The first short video message for playback can also be selected based on any other suitable type of criteria and/or status. For example, in some embodiments the video message application can automatically select a short video message that has not yet been viewed. Alternately or additionally, the video message application can select the short video message based on when it was received. In other embodiments, the first short video message can be manually selected by a user.

Responsive to selection of the first short video message, however it may occur, step 902 initiates playback of the first short video message. In some embodiments, playback can be manually initiated by the user, such as through selection of a control. In other embodiments, playback of the first short video message can occur automatically and without user intervention.

Step 904 automatically plays back at least a second short video message associated with the video message conversation without user intervention. In some cases, the second short video message can be selected based upon when it was received in time relative to the first short video message. Alternately or additionally, a second short video message can be based on criteria and/or status information. For example, in some embodiments, selection of which short video messages to automatically play back can be based on the criteria to only automatically play back short video messages from a particular participant in the video message conversation. In other embodiments, selection of which short video messages to play can be based on a combination of criteria and status information, such as only automatically playing back short video messages from a particular participant that have not already been consumed and/or viewed.

Having considered aspects of playback of interconnected video messages, consider now a discussion of how a single action can be used to stop recording of a short video message and send the message to a recipient.

Single Action Stop Recording and Send

In one or more embodiments, the video messaging application enables a short video message to be recorded and for a single action to be utilized to stop the recording and send the short video message to one or more intended recipients. As an example, consider the following.

Assume, for example, the user has indicated an intent to send a short video message by opening a short video message shell and providing one or more addresses (i.e. phone numbers) in the shell. This can be done in any suitable way. For example, the user may simply select a contact at the UI 1216 and a short video message shell can be automatically opened on display 108. Alternately or additionally, the user may select a control that causes a short video message shell to be opened. The user can then populate the shell with one or more addresses of intended recipients. Alternately or additionally, the user may select a reply option to reply to a previously-received short video message. Once the short video message shell has had an address populated into it by whatever means, the user can select a record option to record their short video message. This step can be performed in any suitable way.

For example, in at least some embodiments, the record option can be selected by way of a hard control, such as a depressible button, on the associated computing device. The user can depress the hard control to initiate video capture. The camera 113, 115 starts to capture video data. While video data is being captured, it can be simultaneously uploaded to the server 103 a recipient device 102A, but cannot be viewed by a recipient. Once the user has terminated the short video message, by releasing the hard control, the short video message is automatically "sent" to the specified recipient or recipients. At this point, a recipient can view the message. If the message exceeds the specified length for short video messages, the application 108 automatically cuts off the recording at the specified time. The message is then automatically delivered to the conversation.

Alternately or additionally, in at least some embodiments the record option can be selected by way of a soft control, such as a displayed video record button. In these embodiments by tapping the video record button, the user can initiate video capture and begin to record their short video message. Data can be preemptively uploaded as before. When the short video message has been completed, the user can simply tap again on the display, e.g., on the button, and the short video message can be automatically "sent" to the specified recipient or recipients. The notion of "sending" the message means allowing the message or portions thereof to be received, by a user. The data may have been preemptively streamed while the message is being recorded, but would not be received by a recipient such that it can be answered. In this case, portions of the short video message may be transmitted from the device to the server 103 or recipient device 102A prior to the user deciding that they wish to have the message actually "delivered" to a recipient party as by, for example, terminating capture of the short video message. Still further, in at least some embodiments a "cancel" option can be provided. In this case, the user may choose to cancel the short video message rather than stopping and sending the message. This can be helpful in situations where a user may change their mind and, can prevent "delivery" even where a message data has been preemptively streamed before a user terminates recording the video. As described below with reference to FIG. 10, the "stop and send" feature can be implemented without preemptively uploading/streaming the message data.

Figure 10:
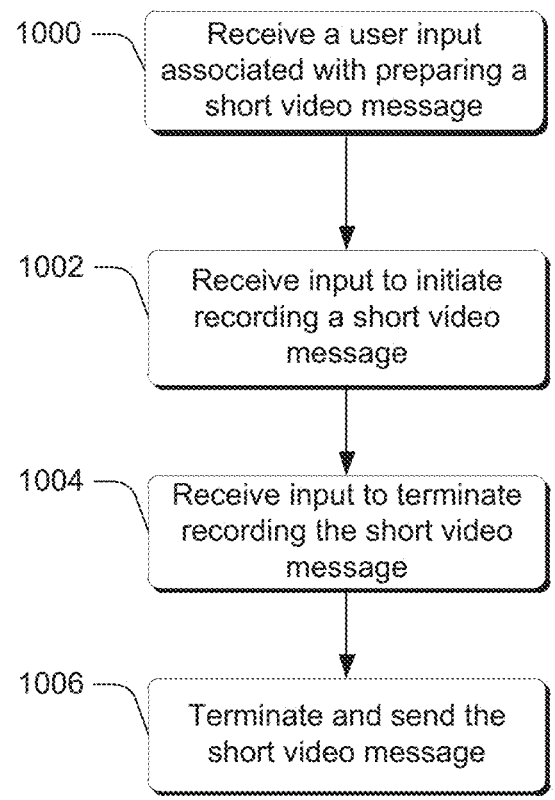
FIG. 10 is a flow diagram that describes steps in a method in accordance with one or more embodiments.

FIG. 10 is a flow diagram that describes steps in a method in accordance with one or more embodiments. The method can be implemented in connection with any suitable hardware, software, firmware, or combination thereof. In at least some embodiments, aspects of the method can be implemented by a suitably-configured video messaging application.

Step 1000 receives a user input associated with preparing a short video message. This input can be received in any suitable way. For example, this input can be received and can be sufficient to cause a short video message shell to be populated with one or more addresses (i.e. phone numbers) of intended recipients of the short video message. Examples of how this can be done are provided above. Step 1002 receives input to initiate recording a short video message. This step can be performed in any suitable way. For example, this step can be performed by receiving input by way of a hard or soft control, as mentioned above.

Step 1004 receives input to terminate recording the short video message. In embodiments that utilize a hard control, this step can be performed by receiving an input that the hard control has been pressed or depressed in some manner. For example, the hard control may reside in the form of a toggle switch. By initially pressing the toggle switch, the video capture mode can be initiated. Subsequently, by pressing the toggle switch again, the video capture mode can be terminated. Alternately, the hard control may reside in the form of a button that is pressed down to record and be released or depressed to terminate recording. In embodiments that utilize a soft control, the soft control may be initially tapped to initiate recording of the short video message. Subsequently, the soft control may again be tapped to terminate recording of the short video message.

Responsive to receiving the input, whether by way of hard or soft control, step 1006 terminates recording of the short video message and automatically sends the message to the recipients who were previously specified to receive the message. In this manner, a single user action is used to terminate recording the short video message and send the message to the intended recipients.

Having considered single action stop recording and send embodiments, consider now a discussion of how a camera can be automatically selected in accordance with one or more embodiments.

Automatic Camera Selection

In one or more embodiments, a particular camera mode, either front camera mode or rear camera mode, can be automatically selected in accordance with a user's action. For example, if a user opens up a new message and provides an address or otherwise indicates an intent to send a message, an assumption is made that the user intends to send a short video message that includes a video of himself or herself. Accordingly, the application 106 automatically selects the front-facing camera so that a video of the user can be taken while a verbal message is conveyed. If, on the other hand, the user chooses to enter a record mode before opening a new message, an assumption is made that the user intends to capture video associated with their environment. Accordingly, the rear-facing, is automatically selected for video capture.

The protocol attempts to guess the likely intent of the user. If a user initiates the interaction with the application by selecting a recipient, then it is expected that the content of the message is most likely to a verbal message, and thus the front facing camera is automatically selected.

If a user initiates the interaction by going directly to a view finder of the computer device before selecting a recipient, then it is expected that the user is trying the capture something in their environment which may be time sensitive, and therefore the rear facing camera is automatically selected.

Thus, in these embodiments, the video messaging application makes an assumption of the user's intent based upon a user action. Once the video messaging application makes its assumption, it automatically selects a camera mode to be used to make a short video message. So, for example, if a user selects a particular contact to which a message is to be sent, as by tapping on the contact, the video messaging application can make assumption that the user intends to send a short video message. Based upon this assumption, the video messaging application can automatically select the front-facing camera. Other user actions can result in the automatic selection of the front-facing camera. For example, instead of selecting a particular contact to which to send the message, the user may simply open up a new message shell and may or may not provide an address. In this instance, by selecting a new message shell, the video messaging application assumes that the user's intent is to send a short video message. As such, the front-facing camera can be selected automatically. Alternately or additionally, other user actions such as responding to a conversation that already exists can result in the video messaging application automatically selecting the front-facing camera.

As an example, consider FIG. 3. There, if the user selects one of the icons at the lower right thus indicating an intent to create a new message, the front-facing camera can be automatically selected based on the assumption that the user wishes to send a short video message. On the other hand, assume the user selects viewfinder 304 because they wish to record something in front of them, the rear-facing camera can be automatically selected based on the assumption that the user does not wish to record themselves.

Figure 11:
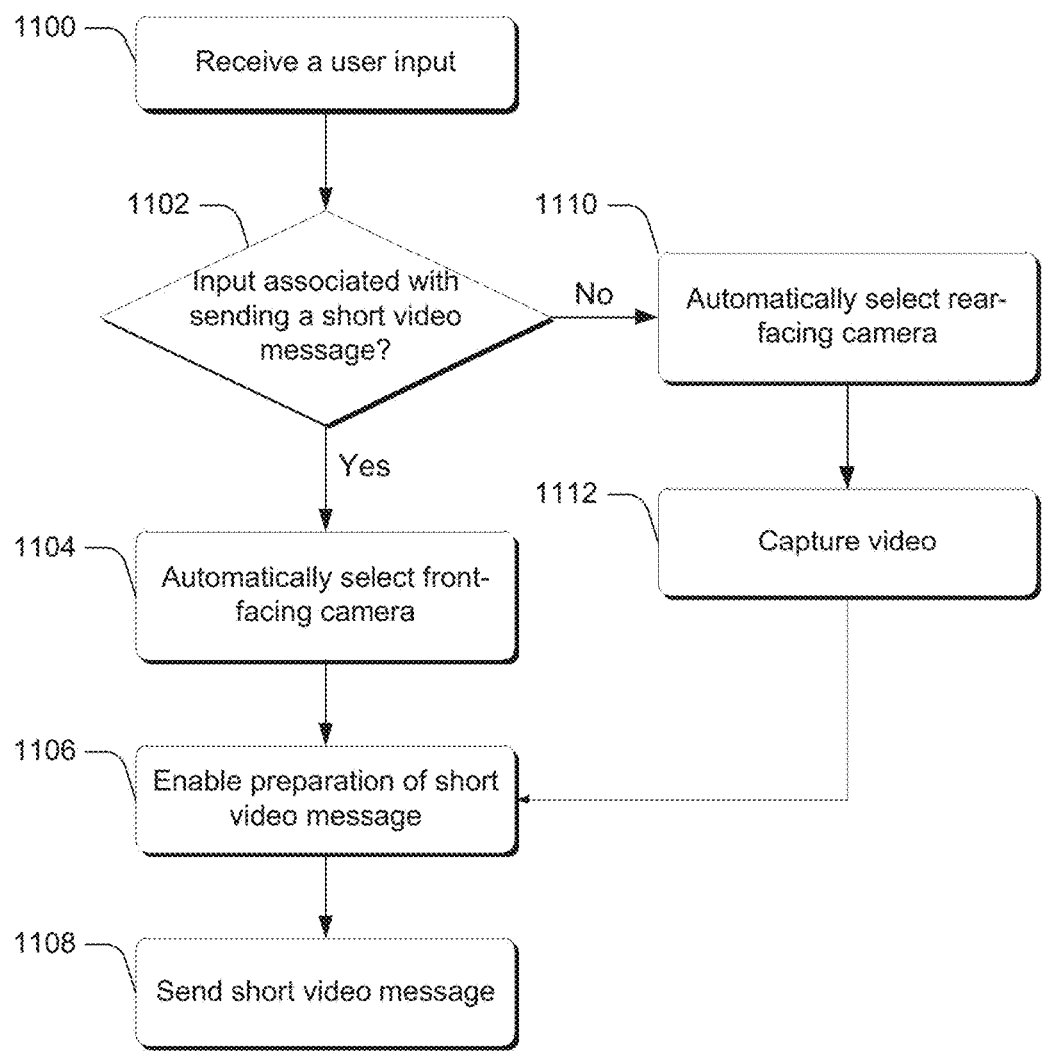
FIG. 11 is a flow diagram that describes steps in a method in accordance with one or more embodiments.

FIG. 11 is a flow diagram that describes steps in a method in accordance with one or more embodiments. The method can be implemented in connection with any suitable hardware, software, firmware, or combination thereof. In at least some embodiments, aspects of the method can be implemented by a suitably-configured video messaging application.

Step 1100 receives a user input. This step can be performed by a suitably-configured computing device having a video messaging application installed thereon. Step 1102 ascertains whether the input is associated with sending a short video message. This step can be performed in any suitable way. For example, input associated with sending a short video message can include, by way of example and not limitation, receiving the user input via a selectable control which enables a new video message shell to be instantiated. Alternately or additionally, the input can include selection of one or more contacts to which a new video messages to be sent. Alternately or additionally, the input can include receiving an input associated with responding to a previously-received short video message. Alternately or additionally, the input can include receiving one or more addresses into a short video message shell.

Responsive to receiving an input associated with sending a short video message, step 1104 automatically selects a front-facing camera of the computing device and step 1106 enables preparation of a short video message. In this particular flow diagram path, this step can be performed by receiving a selection of a record button or control and recording the short video message. Step 1108 sends the short video message to one or more intended recipients.

If, on the other hand, step 1102 ascertains that the input is not associated with sending a short video message, step 1110 automatically selects a different camera, e.g., a rear-facing camera and step 1112 captures video with the rear-facing camera. Capture of the video can be performed responsive to receiving a user input by way of a record button or control. Step 1106 enables preparation of a short video message. This can include, in this particular flow diagram path, enabling the user to incorporate the video captured from the rear-facing camera into a short video message shell along with enabling the user to enter one or more addresses into the short video message shell. Step 1108 sends the short video message to one or more intended recipients.

Having considered automatic camera selection in accordance with one or more embodiments, consider now a discussion of preemptive processing.

Preemptive Processing

In various embodiments, preemptive processing can be utilized to increase the communication speed and reduce the perceived latency by the user. The illustrated and described embodiments, preemptive processing can take place in the form of preemptive uploads and preemptive downloads, each of which is discussed below under its own sub-heading.

Preemptive Upload

In at least some embodiments, content of a short video message can be uploaded to a particular server while the user is still completing the short video message. In this manner, the communication speed of the message can be increased. As an example, consider a situation in which the user is creating a short video message but has not yet indicated the recipient of the message. As soon as the user starts recording the message the content can begin to be reactively uploaded to the server even while the user has not indicated an intended recipient. Once the user indicates the recipient or recipients of the short video message, the recipients' addresses (e.g., phone numbers) can be provided to the server and the short video message can be delivered to the intended recipients.

Preemptive uploading can also work in a situation where the user has provided an address of an intended recipient and begins to compose the short video message. Similar to the approach described above, as soon as the user begins to compose the short video message, message content and the intended recipient addresses can be uploaded to the server while the user is composing the message. Upon completion of the message, the message can then be delivered to the intended recipients.

In this sense "delivery" allows the recipient to view the message. There is a permission indicator which indicates whether or not the message data is available to be viewed by the indicated recipient. When data is not available to be viewed (permission equals negative), then the message data is held at the server, or in a contained area of storage at the recipient device. When the message is to be "delivered", the permission status is changed (permission equals positive), and this triggers downloading of the message data from the server to the recipient device, or release of the containment mechanism at the recipient device to allow the message to be viewed.

Preemptive Download

Preemptive processing can also include preemptively downloading portions of short video messages. Preemptive downloading can help to mitigate buffer delays and jitter during message playback. As an example consider the following. Assume that Max composes a short video message to Grace. When Max sends the short video message to Grace, the message can be downloaded on Grace's device before Grace is notified that there is a message waiting. In this manner, if she attempts to play the message back, the entire message file is on her device so that there will be no interruption to play back. This is the case even if Grace loses network connectivity.

At least some embodiments, preemptive upload and preemptive download can work in concert with one another to create an efficient message distribution pipeline. Specifically, while the user composes particular message to an intended recipient, during composition message content can be preemptively uploaded to the server and preemptively downloaded to the intended recipient. Upon completion of the message composition, the remainder of the message can be preemptively downloaded and a notification can then be generated to the recipient that they have a new message in the message queue.

Having considered preemptive processing in accordance with one or more embodiments, consider now a discussion of various features which can enhance the user experience.

Emoticons and Pre-Canned Responses

In many instances, a recipient of a short video message may not be in a position or location where they can record a video response. Yet, they may wish to confirm to the sender that the short video message was received, e.g., "I got your message." In a video messaging application that is primarily video-based, pre-recorded responses can be utilized to provide a notification to the sender that a short video message was received. Pre-recorded responses are held in local memory, such as RAM 1213 or server/cloud storage, associated with the device. Each pre-recorded response is stored in association with a tag which allows a user to identify the response to be transmitted. The tag identifies the nature of the response, for example a response intended to indicate "I got your message", or a response intended to indicate "I am out at the moment but I will reply soon". When a pre-recorded response is created, the tag is created by the user such that it can be stored with the response. When a response is required to be transmitted, the user can select the response by identifying the tag. This can be done by allowing the user to select from a plurality of tags displayed on display 108, or by the user entering the tag using text or some other mechanism at the UI 1216. The pre-recorded responses can take any suitable form. For example, pre-recorded responses can utilize various emoticons that can be selected by the user or even customized by the user. For example, the user may select from a variety of preconfigured emoticons that provide a notification to the sender that the message was received. Alternately or additionally, users may be able to customize an emoticon in any suitable way. For example, the user may select a generic emoticon and then select features to make the emoticon look like an animated version of themselves. The notification may take any suitable form such as, for example, a 5-10 second animation that represents a common response to message such as "I'm busy, can't talk" or "Got your message, I really liked it."

Alternately or additionally, the user might create their own recorded pre-canned video response that they may select and send to the sender of the short video passage. Such a video response would typically feature the user replying in some manner to the sender, e.g., "Hi, I received your message and it is important to me. However, I'm unable to send a reply at the present time. As soon as I am able, I will reply to your message. Cheers!"

In yet other embodiments, the user may be able to select a movie clip or a television show clip from a library of clips to use as their pre-canned response. For example, a user may select a movie clip of Robert De Niro in the movie Taxi Driver in which the actor looks into the mirror and asks "You talking to me?" Similarly, from the movie E.T. the Extraterrestrial, the user may select the clip in which E.T. says "E.T. phone home."

From a business model standpoint, these clips may be licensed to users who would pay a small fee to be able to use the clips as their pre-canned response.

Having considered various embodiments, consider now a discussion of example device that can be utilized to implement the embodiments described above.

Variations of the computer device described herein are contemplated, for example, device also includes computer-readable media, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device can also include a mass storage media device.

Computer-readable media provides data storage mechanisms to store the device data, as well as various device applications and any other types of information and/or data related to operational aspects of device. For example, an operating system can be maintained as a computer application with the computer-readable media and executed on processors. The device applications can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications also include any system components or modules to implement embodiments of the techniques described herein. In this example, the device applications include an interface application and a gesture-capture driver that are shown as software modules and/or computer applications. The gesture-capture driver is representative of software that is used to provide an interface with a device configured to capture a gesture, such as a touchscreen, track pad, camera, and so on. Alternatively or in addition, the interface application and the gesture-capture driver can be implemented as hardware, software, firmware, or any combination thereof. In addition, computer readable media can include a web platform, a gesture module, and a video messaging application that functions as described above.

Device also includes an audio and/or video input-output system that provides audio data to an audio system and/or provides video data to a display system. The audio system and/or the display system can include any devices that process, display, and/or otherwise render audio, video, and image data. Video signals and audio signals can be communicated from device to an audio device and/or to a display device via an RF (radio frequency) link, S-video link, composite video link, component video link, DVI (digital video interface), analog audio connection, or other similar communication link. In an embodiment, the audio system and/or the display system are implemented as external components to device. Alternatively, the audio system and/or the display system are implemented as integrated components of example device.

CONCLUSION

Various embodiments enable a video messaging experience which permits the exchange of short video messages in an asynchronous manner. The video messaging experience preserves the video intimacy and experience of synchronous-type video communications, while at the same time provides the convenience of SMS-type message exchange.

The video messaging experience is provided by a video messaging application which, in at least some embodiments, enables a short video message to be recorded and for a single action to be utilized to stop the recording and send the short video message to one or more intended recipients.

Various embodiments provide an ability to visually annotate, in a plurality of video message conversations, a respective status of each video message conversation in the plurality of video message conversations. In some cases, a video message conversation can be represented using a thumbnail video image. Some embodiments generate the thumbnail video image based, at least in part, on a most recently received video clip in the respective video message conversation.

Yet other embodiments enable a particular camera mode, either front camera mode or rear camera mode, to be automatically selected in accordance with a user's action.

Other embodiments enable portions of video message conversations to be played back in an interconnected fashion. Specifically, a filmstrip is provided as part of a user interface. The filmstrip includes a video representation, e.g. a thumbnail image, associated with each short video message in a video message conversation. Selection of a particular video representation were result in the video message conversation being played back, from that point, in a continuous fashion which includes the other short video messages that serially follow the selected video representation.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:
1. A computer-implemented method, executed at a computer device, of selecting a camera of the computer device to record a video message, the method comprising:
 prior to recording the video:
 receiving, at a user interface component of the computer device, a user input from a user;
 determining an intent of the user based upon the user input; and
 automatically selecting, for recording a video, between a front facing camera of the computer device and a rear-facing camera of the computer device based upon the determined intent of the user;
 responsive to determining that the intent of the user is to send a video message including the video:
 automatically selecting the front-facing camera of the computer device for recording of the video;
 recording the video with the front-facing camera;
 creating the video message including the video recorded with the front-facing camera; and
 sending the video message to a recipient; and
 responsive to determining that the intent of the user is not to send a video message, automatically selecting the rear facing camera of the computer device to record the video.

2. The computer-implemented method of claim 1, wherein determining that an intent of the user is to send a video message comprises determining whether the user input indicates an interaction with the computer device via a selectable control which enables a new video message to be instantiated.

3. The computer-implemented method of claim 1, wherein determining that an intent of the user is to send the video message comprises determining whether the user input indicates an interaction with the computer device which includes selection of one or more contacts to which the video message can be sent.

4. The computer-implemented method of claim 1, wherein determining that an intent of the user is to send a video message comprises determining whether the user input indicates an interaction with the computer device associated with responding to a previously-received video message.

5. The computer-implemented method of claim 1, wherein determining that an intent of the user is to send a video message comprises determining that the user input is a selection of a reply option to reply to a previously-received video message.

6. The computer-implemented method of claim 1, wherein determining that an intent of the user is to send a video message comprises determining whether the user input includes populating one or more addresses into a video message shell.

7. The computer-implemented method of claim 1, further comprising, uploading portions of the video to a remote computing device while recording the video.

8. The computer-implemented method of claim 1, wherein determining that an intent of the user is not to send a video message comprises determining that the user input indicates an interaction with the computer device to select a photo taking capability.

9. One or more computer readable storage media storing computer readable instructions which, when executed, perform operations comprising:
  prior to recording a video:
  receiving, at a user interface component of the computer device, a user input from a user;
  determining an intent of the user based upon the user input; and
  automatically selecting, for recording a video, between a front facing camera of the computer device and a rear-facing camera of the computer device based upon the determined intent of the user;
  responsive to determining that the intent of the user is to send a video message including the video:
    automatically selecting the front-facing camera of the computer device for recording of the video;
    recording the video with the front-facing camera;
    creating the video message including the video recorded with the front-facing camera; and
    sending the video message to a recipient; and
  responsive to determining that the intent of the user is not to send a video message, automatically selecting the rear facing camera of the computer device to record the video.

10. The one or more computer readable storage media of claim 9, wherein the operations of determining that an intent of the user is to send a video message comprises determining whether the user input indicates an interaction with the computing device via a selectable control which enables a new video message to be instantiated.

11. The one or more computer readable storage media of claim 9, wherein the operations of determining that an intent of the user is to send a video message comprises determining whether the user input indicates an interaction with the computing device which includes selection of one or more contacts to which a video message can be sent.

12. The one or more computer readable storage media of claim 9, wherein the operations of determining that an intent of the user is to send a video message comprises determining whether the user input is associated with responding to a previously-received video message.

13. The one or more computer readable storage media of claim 9, wherein the operations of determining that an intent of the user is to send a video message comprises determining whether the user input indicates an interaction with the computing device which includes receiving one or more addresses into a video message shell.

14. A computing device comprising:
  a front-facing camera and a rear-facing camera;
  a user input device;
  one or more processors communicatively coupled to the front-facing and rear-facing cameras and the user input device; and
  one or more computer readable storage media, instructions embodied on the one or more computer readable storage media which, when executed by the one or more processors, perform operations comprising:
  prior to recording a video:
  receiving, from the user input device, a user input from a user;
  determining an intent of the user based upon the user input; and
  automatically selecting, for recording a video, between the front facing camera and the rear-facing camera based upon the determined intent of the user;
  responsive to determining that the intent of the user is to send a video message including the video:
    automatically selecting the front-facing camera of the computer device for recording of the video;
    recording the video with the front-facing camera;
    creating the video message including the video recorded with the front-facing camera; and
    sending the video message to a recipient; and
  responsive to determining that the intent of the user is not to send a video message, automatically selecting the rear facing camera of the computer device to record the video.

15. The computing device of claim 14, wherein the operations of determining that an intent of the user is not to send a video message comprises determining that the user input indicates an interaction with the computing device which includes selecting a viewfinder.

16. The computing device of claim 14, wherein the computing device comprises a phone.

* * * * *